(12) United States Patent
Monnett et al.

(10) Patent No.: US 11,631,039 B2
(45) Date of Patent: Apr. 18, 2023

(54) GENERATING PRIORITIES FOR SUPPORT TICKETS

(71) Applicant: SupportLogic, Inc., San Jose, CA (US)

(72) Inventors: Charles Monnett, San Jose, CA (US); Carl Waldspurger, San Jose, CA (US); Lawrence Spracklen, San Jose, CA (US); Krishna Raj Raja, San Jose, CA (US)

(73) Assignee: SupportLogic, Inc., Sunnyvale, CA (US)

( * ) Notice: Subject to any disclaimer, the term of this patent is extended or adjusted under 35 U.S.C. 154(b) by 102 days.

(21) Appl. No.: 16/788,092

(22) Filed: Feb. 11, 2020

(65) Prior Publication Data

US 2020/0258013 A1 Aug. 13, 2020

Related U.S. Application Data

(60) Provisional application No. 62/803,981, filed on Feb. 11, 2019.

(51) Int. Cl.
*G06Q 10/0633* (2023.01)
*G06N 20/00* (2019.01)
(Continued)

(52) U.S. Cl.
CPC ......... *G06Q 10/0633* (2013.01); *G06N 20/00* (2019.01); *G06N 20/20* (2019.01);
(Continued)

(58) Field of Classification Search
CPC combination set(s) only.
See application file for complete search history.

(56) References Cited

U.S. PATENT DOCUMENTS 6,832,205 B1 12/2004 Aragones et al.
9,000,934 B1 4/2015 Gordin et al.
(Continued)

OTHER PUBLICATIONS

C. Bartolini, C. Stefanelli and M. Tortonesi, "Modeling IT support organizations using multiple-priority queues," 2012 IEEE Network Operations and Management Symposium, 2012, pp. 377-384, doi: 10.1109/NOMS.2012.6211921. (Year: 2012).*

(Continued)

*Primary Examiner* — Crystol Stewart
(74) *Attorney, Agent, or Firm* — Dergosits & Noah LLP; Todd A. Noah

(57) ABSTRACT

System trains machine learning model to determine content data, metadata, and context data for support ticket communications, in response to receiving support ticket communications. Machine learning model receives communication associated with support ticket, and determines content data, metadata, and context data for communication. System converts content data, metadata, and context data for communication into first impulse for first channel and second impulse for second channel. System determines first channel value based on first type of conversion of first impulse and any impulses for first channel that are converted from data that is determined for support ticket event. System determines second channel value based on second type of conversion of second impulse and any impulses for second channel that are converted from data that is determined for support ticket event. System uses first channel value and second channel value to generate priority associated with support ticket, and outputs priority.

20 Claims, 5 Drawing Sheets

(51) Int. Cl.
*H04L 41/5061* (2022.01)
*G06Q 10/06* (2023.01)
*H04L 51/02* (2022.01)
*G06N 20/20* (2019.01)
*H04M 3/51* (2006.01)
*H04M 3/523* (2006.01)

(52) U.S. Cl.
CPC ......... *G06Q 10/06* (2013.01); *H04L 41/5064* (2013.01); *H04L 51/02* (2013.01); *H04M 3/523* (2013.01); *H04M 3/5175* (2013.01)

(56) References Cited

U.S. PATENT DOCUMENTS

| | | | |
|---|---|---|---|
| 9,473,637 B1 | 10/2016 | Venkatapathy et al. | |
| 9,678,817 B1 | 6/2017 | Hasbun Pacheco et al. | |
| 10,438,212 B1* | 10/2019 | Jilani | G06N 20/00 |
| 10,594,757 B1* | 3/2020 | Shevchenko | G06F 40/35 |
| 2003/0046250 A1 | 3/2003 | Kuettner et al. | |
| 2004/0054743 A1* | 3/2004 | McPartlan | H04M 3/5235 709/206 |
| 2010/0158236 A1* | 6/2010 | Chang | H04M 3/5175 379/265.03 |
| 2010/0198635 A1 | 8/2010 | Pirtle et al. | |
| 2012/0143564 A1 | 6/2012 | Li et al. | |
| 2013/0268262 A1 | 10/2013 | Moilanen et al. | |
| 2014/0164530 A1* | 6/2014 | Stoertenbecker | H04L 51/32 709/206 |
| 2014/0188457 A1 | 7/2014 | Fink et al. | |
| 2014/0222528 A1* | 8/2014 | Chang | G06Q 30/016 705/7.42 |
| 2014/0245075 A1 | 8/2014 | Dhoolia et al. | |
| 2015/0254687 A1 | 9/2015 | Konopka et al. | |
| 2015/0254689 A1 | 9/2015 | Amemiya | |
| 2016/0098480 A1 | 4/2016 | Nowson | |
| 2016/0283936 A1* | 9/2016 | Daniel | G06Q 20/12 |
| 2017/0242919 A1 | 8/2017 | Chandramouli et al. | |
| 2018/0068226 A1* | 3/2018 | O'Connor | G10L 15/22 |
| 2018/0108022 A1* | 4/2018 | Bandera | G06Q 10/06316 |
| 2018/0131559 A1 | 5/2018 | Tapia et al. | |
| 2018/0211260 A1* | 7/2018 | Zhang | G06Q 30/016 |
| 2018/0276061 A1 | 9/2018 | An et al. | |
| 2019/0213605 A1 | 7/2019 | Patel et al. | |
| 2020/0004434 A1 | 1/2020 | Borlick et al. | |
| 2020/0145303 A1* | 5/2020 | Benkreira | G06Q 30/016 |
| 2020/0151640 A1* | 5/2020 | Chen | G06Q 10/06 |
| 2020/0193447 A1* | 6/2020 | Jaiswal | G06Q 30/016 |
| 2020/0228452 A1* | 7/2020 | Boss | G06N 20/10 |
| 2021/0081972 A1* | 3/2021 | Sahni | G06Q 30/0203 |
| 2021/0089624 A1* | 3/2021 | Bealby-Wright | G06N 20/20 |
| 2021/0092029 A1* | 3/2021 | Kumar | G06Q 10/063112 |
| 2021/0201359 A1* | 7/2021 | Sekar | G06Q 30/0202 |
| 2021/0240774 A1* | 8/2021 | Bikumala | G06N 20/00 |

OTHER PUBLICATIONS

Montgomery, Lloyd. "Escalation Prediction using Feature Engineering: Addressing Support Ticket Escalations within IBM's Ecosystem." arXiv preprint arXiv:2010.06390 (2020). (Year: 2020).*

Office Action dated Sep. 25, 2020, from related U.S. Appl. No. 16/352,692.

Office Action dated Mar. 1, 2021, from related U.S. Appl. No. 16/512,638.

* cited by examiner

GENERATING PRIORITIES FOR SUPPORT TICKETS

CROSS REFERENCE TO RELATED APPLICATION

This application claims priority under 35 U.S.C. § 119 or the Paris Convention from U.S. Provisional Patent Application 62/803,981, entitled "MECHANISM TO IDENTIFY PRIORITY OF SUPPORT TICKETS," filed Feb. 11, 2019, the entire contents of which is incorporated herein by reference as if set forth in full herein.

BACKGROUND

A ticketing system (such as provided by Jira, GitHub, ServiceNow, Salesforce, Zendesk, or Freshdesk) generates tickets, which may be referred to as support tickets, service tickets, or cases, that track the communications between individuals, users, groups, teams, organizations, and businesses in spaces such as support, user service, sales, engineering and information technology. Although many of the following examples are described in the context of a ticketing system for a support space, embodiments of this disclosure apply equally to other ticketing systems for other spaces. In a support space example, a customer of a software product experiences a problem using the software product, activates a ticketing system, and submits a support ticket to the support organization which provides support for the software product. The support organization employs support agents who can receive the support ticket and respond to the customer, which maintains strong accountability standards and commands customer loyalty. In an ideal situation, a support agent accurately identifies, troubleshoots, and resolves a customer's problem in a timely manner, and closes the support ticket. However, in a less than ideal situation, a customer may become dissatisfied with a support agent's response to a support ticket, relative to the priority level that the customer perceives for a problem.

Support organizations can receive requests that have a wide range of customer perceived priority levels. An example of a support ticket with a low priority level is a customer request for stickers and t-shirts, which is common for products that have a positive public image. An example of a support ticket with a high priority level is a customer's request for help with a catastrophic software failure that is causing downtime in production systems and critical data loss. Consequently, a support organization needs to identify support tickets that have a high priority and notify their support agents about high priority support tickets because the support organization may be liable for their customers' losses, and minimizing such losses both minimizes the support organization's liability and strengthens its relationships with its customers.

Support organizations that have many customers typically have difficulty prioritizing their relationships with their customers or invest heavily into closely evaluating those relationships. These support organizations need to understand the best way to focus finite resources to provide effective services and respond to support tickets in an intelligent manner, in contrast to taking a simple first-come-first-served approach. Many support organizations employ support teams whose sole purpose is to monitor the activity of support tickets, manage queues and assignments of support tickets, and proactively intervene when the resolutions of support tickets' problems are stalled. Such a potentially effective solution may become extremely costly and ultimately does not scale.

Many support organizations use a customer relationship management (CRM) software field to denote a support ticket's priority level, which becomes the de facto standard for determining the attention that the support ticket requires. However, since priority levels are often either poorly defined or communicated, these priority levels may become a distraction to both a customer and a support agent. A customer's emotional reaction to a problem can influence the customer's perception of a support ticket's priority, such as emotional reactions based on the problem's impact on a customer's work or their business, whether the customer was away or on vacation when the problem occurred and still had to respond to the problem, how visible the problem is to the customer's supervisor, and the customer's stress level.

A customer may assign a priority level, such as urgent, when initiating a support ticket, but the responding support agent may lower the priority to another level, such as normal, because the support agent thinks that the support ticket's circumstances do not adequately match the parameters for an urgent priority level. In such a situation, the customer may feel forced to explain why their circumstances justify the urgent priority level, but such a debate about the priority level can distract the customer and the support agent from trying to identify, diagnose, or correct the problem that caused the customer to initiate the support ticket. If the customer feels forced to accept the support agent's lowering of the priority level, the customer may feel as though the support agent considers the customer's problem to be unimportant. The time spent justifying a high priority level and the feeling of unimportance are bad experiences for a customer, which may eventually compromise the relationship between the customer and a support organization, ultimately resulting in lost revenue for the support organization.

Rigid priority levels are poor at capturing the dynamic scenarios that often occur after a customer initiates a support ticket, such as a support ticket that has a legitimate urgent priority level because the customer is experiencing a major problem that significantly affects the customer's business. If a support agent is able to identify the cause of the problem and provide a temporary solution that remediates the problem without correcting the underlying cause, the customer and the support agent may disagree on the temporary solution's effect on the urgent priority level. If the customer had experienced the problem once every forty-eight hours and wants to wait at least that long to verify that the temporary solution has remediated the problem, then the customer may not agree with the support agent's reduction of the priority level. If the support agent reduced the priority level and the problem occurs again, the support organization's control of the priority level may prevent the customer from raising the priority level in enough time to alert the support agent and prevent additional adverse consequences for the customer due to the recurrence of the problem. However, if the support agent did not reduce the priority level after providing the temporary solution, and the problem does not recur, then the support ticket can clog up dashboards and reporting tools by continuing to be listed among other support tickets that actually require the urgent priority level. Additionally, if the support agent reduced the priority level, the support organization's management may not be able to perform adequate accounting or retroactive analysis of support tickets based on priority level without some form of clumsy and expensive manual tracking of support tickets, perhaps in spreadsheet software. Therefore, the rigidity of priority-levels creates challenges when a support organization attempts to simultaneously provide a high quality of service and high-quality reporting to the support organization's management.

DETAILED DESCRIPTION

Figure 1:
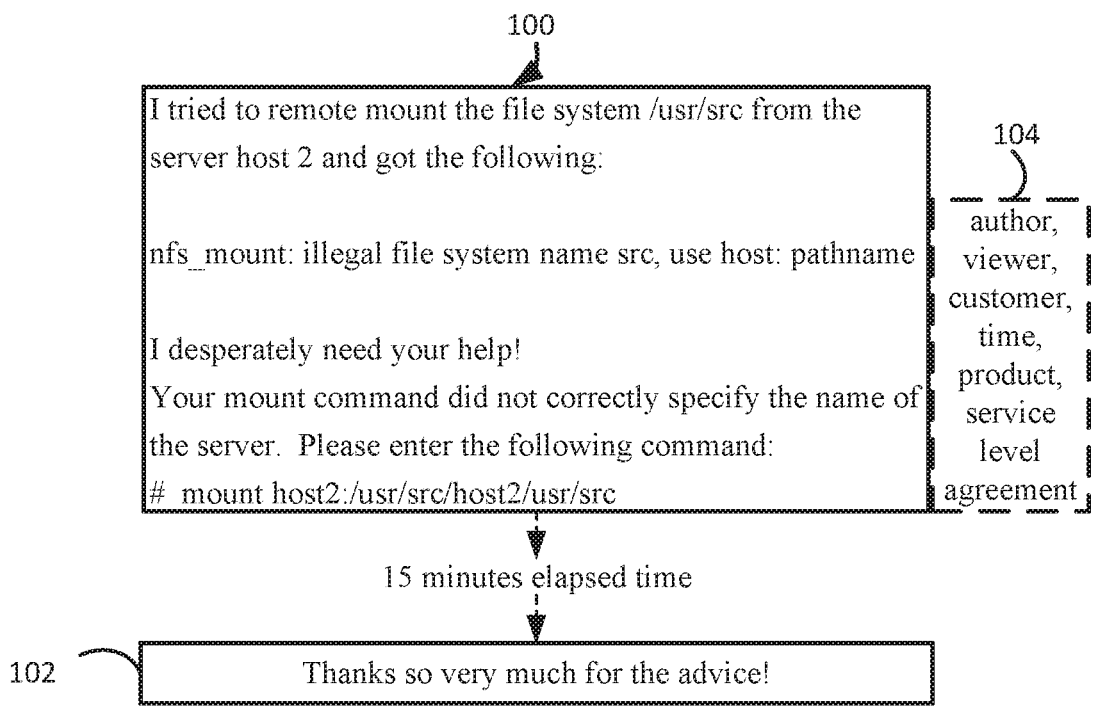
FIG. 1 illustrates a block diagram of example training data structures for generating priorities for support tickets, under an embodiment.

A conventional CRM system cannot adequately track the dynamic natural language that a customer uses in a support ticket, which could be the basis for generating the support ticket's priority level, because attempts to provide enough types of data input fields to capture all or even a subset of the dynamic natural language used in support tickets would likely result in an unwieldy, inefficient, and highly inaccurate CRM system. Consequently, support agents would either spend too much time populating set CRM fields to have time for performing their core duties or give up populating these fields. Additionally, updating and changing these CRM fields over time, such as adding new fields or combining two fields into one field, would render historical reporting inaccurate and thus ineffective. User fatigue would result from routinely attempting to update these fields, resulting in a lack of user interest and eventually a lack of user participation and/or accuracy of user input. Whether a credit card processing company is unable to process credit card transactions in a test environment or in the system that handles all credit card transactions in North America are significantly different problems which the credit card processing company cannot express in a simple dropdown menu offering options such as Urgent or High Priority. A customer may need an answer to a simple technical question for a legal document, and may need the answer by the end of that business day, but such a request cannot be captured by simple CRM dropdown fields that would be very useful for a support agent to understand. If the CRM dropdown fields included a sufficient number of options for such a request to be expressed, the sheer number of options would render the CRM system unusable for a support agent's use and for generating support organization metrics. Furthermore, customers typically do not populate CRM fields reliably, as they tend to exaggerate the urgency of their problems, perhaps because these customers do not know how such CRM fields' information will be used.

Consequently, some customer service companies have attempted to determine the priority levels of support tickets based on the automated processing of natural language instead of the use of CRM fields. A bag of words model is a natural language processing technique used for classifying natural language text, such as assigning a classification of positive or negative to a movie review based on the positive and negative words in the review's natural language text. Bag of words models are trained to learn tokens, which are particular words or small phrases, and learn weights for the tokens, which are associated with classes or classifiers. Continuing with the movie review example, since the token bad is in more negative reviews than positive reviews, a bag of words model learns a negative weight for the token bad. Although bag of words models may be reasonably accurate when classifying long documents, these models produce noisy results for small input sizes, such as sentence- or phrase-level texts, because of the small number of tokens available for weighting. Even classifying long documents may be problematic when dealing with technical support communications which often includes both human-generated natural language text and machine-generated text which is not in a natural language.

In theory, bag of words models could retain all learned tokens and all learned classification weights for all learned tokens, but in practice these models do not retain tokens that appear infrequently because the use of infrequently appearing tokens results in too much noise. Furthermore, many of these bag of words models may retain only a limited number of tokens, which is determined by the computer resources available to train and use the models. A bag of words model that attempts to learn the weights for a large number of tokens requires longer time to be trained, so the number of tokens is limited for practical purposes. Consequently, some customer service companies use a limited bag of words model for the natural language processing to determine priority levels based on whether customers use profanity over the telephone or in a public social media post. Even if such a method was effective in a customer service environment, this method would not be as effective in the more structured and/or professional communication style of business-to-business support.

Embodiments herein enable generating priorities for support tickets. A system trains a machine learning model to determine content data, metadata, and context data for support ticket communications, in response to receiving the support ticket communications. The machine learning model receives a communication associated with a support ticket, and determines content data, metadata, and context data for the communication. A system converts the content data, the metadata, and the context data for the communication into a first impulse for a first channel and a second impulse for a second channel. The system determines a first channel value based on a first type of conversion of the first impulse and any impulses for the first channel that are converted from data that is determined for a support ticket event. The system determines a second channel value based on a second type of conversion of the second impulse and any impulses for the second channel that are converted from the data that is determined for the support ticket event. The system uses the first channel value and the second channel value to generate a priority associated with the support ticket, and outputs the priority.

Figure 2:
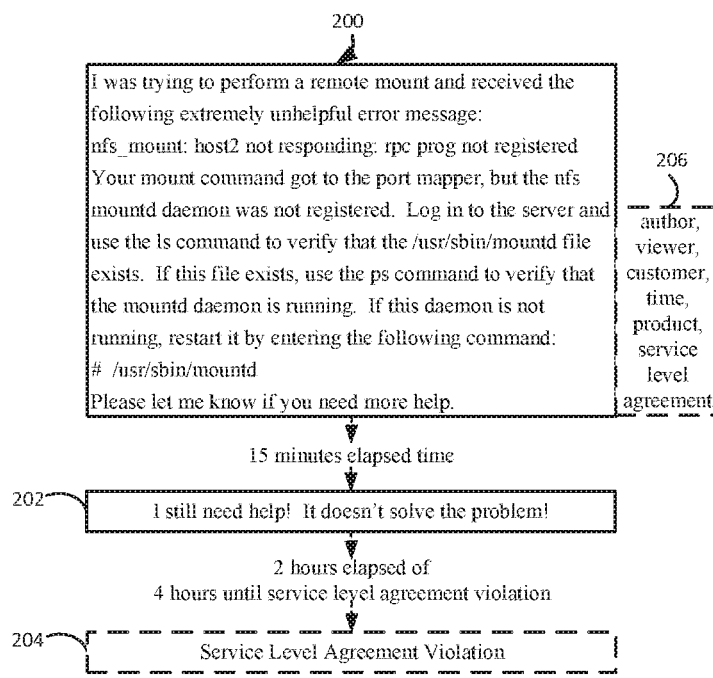
FIG. 2 illustrates a block diagram of example production data structures for generating priorities for support tickets, under an embodiment.

For example, a system includes a training server that receives a training set of support ticket communications, which includes the support ticket 100 that contains all subsequent communications 102 and the support ticket's metadata 104, as depicted by FIG. 1. Then the training server trains a machine learning model to determine data for the support ticket's first communication, including content data which contains a request for help with a remote mount problem, metadata which identifies the requester as a customer's manager named Ann, and context data which is used to classify the sentiment of Ann's request as unusually desperate. The system also has a production server that receives support ticket communications, which includes the support ticket 200 that contains all subsequent events 202 and 204, and the support ticket's metadata 206, as depicted by FIG. 2. The trained machine learning model determines data for the support ticket's third communication 202, including content data which contains a request for help and a rejection of a recommended remote mount solution, metadata which identifies the requester as a customer's manager named Chris, and context data which is used to classify the sentiment of Chris' request as unusually frustrated, as depicted in FIG. 2. The production server converts the content data for the request into a follow-up request impulse that has a magnitude of +4 in a customer-waiting channel, and converts the content data for the rejection of the recommended remote mount solution into a rejected solution impulse that has a magnitude of +10 in a problem-solved channel. The production server converts the metadata into a is manager impulse that has a magnitude of +3 in a participants channel, because the participant is a manager, and a manager-waiting impulse that has a magnitude of +4 in a customer-waiting channel because it is a manager who is waiting. The production server converts the context data for unusually frustrated into a frustrated impulse that has a magnitude of +8 in the customer-sentiment channel and a new-participant impulse that has a magnitude of +2 in the participants channel because Chris is a new participant in the ticket based on previous communications. Then the production server aggregates the customer-waiting channel value of +8, the problem-solved channel value of +10, the participants channel value of +5, the customer-sentiment channel value of +8, and the baseline value of 30 to generate a Needs Attention Score of 61.

Two hours pass without a support response to Chris' latest request, and the channels convert their impulses into channel values. The customer-waiting channel uses the follow-up request impulse that has a magnitude of +4, the manager-waiting impulse that has a magnitude of +4, a two hour incrementation value of +2, and an impending service level agreement violation value of +15 to convert the previous customer-waiting channel value of +8 to the updated customer-waiting channel value of +25. The problem-solved channel uses the rejected solution impulse that has a magnitude of +10 which is not changed by the passage of two hours for a channel value of +10. The customer-sentiment channel uses the frustrated impulse that has a magnitude of +8 which is not changed by the passage of two hours for a channel value of +8. The participants channel uses the is manager impulse that has a magnitude of +3 and the new-participant impulse that has a magnitude of +2 for a channel value of +5 which is not changed by the passage of two hours. Then the production server aggregates the updated customer-waiting channel value of +25, the unchanged problem-solved channel value of +10, the unchanged customer-sentiment channel value of +8, the unchanged participants channel value of +5, and the baseline value of 30 to generate a Needs Attention Score of 78, which triggers an alert to both Dana the support agent and to Bob, who is Dana's supervisor. The alert notifies the support agent and the support agent supervisor that a response needs to be sent to the customer within two hours to avoid a violation of the service level agreement that the support organization has with the customer.

The system generates a priority, which may be implemented as a Needs Attention Score, that represents how much attention a support organization and its support agents should give to a support ticket which was initiated by a customer. These generated priorities for support tickets enable the real-time allocation of a support organization's customer support operations towards their customers' problems which are currently the most critical. Efficiently allocating these resources to the most critical customer problems enables high quality of service. The generated priorities identify customers' support tickets with the most urgent or critical needs in order to direct resources to these customers' problems, resulting in a more positive customer experience. The generated priorities also guide resources away from support tickets for which there is not an urgent need, thereby increasing available resources for the most critical support tickets leading to higher quality of service when customers need it most. Displaying the generated priorities to support agents provides an at-a-glance visibility into the status and relative merit of support tickets across their customer support organization through real-time and fine-grained tracking of support ticket criticality.

By automatically generating the priority for each support ticket, the system avoids problems arising from support agents and their customers disagreeing on the priorities of the support tickets, because what constitutes a high priority from a support organization's perspective is frequently very different from what their customers deem as a high priority. For example, a support ticket that has a relatively low priority level from a customer's perspective could have a higher priority level if the support organization is at the risk of losing that particular customer. Similarly, a support ticket that has a relatively high priority level from a customer's perspective could have a lower priority level if that particular customer has a tendency to inflate the importance and urgency of all their problems, even minor ones. Furthermore, the system uses the content that the customers provided in their support ticket communications to derive their support tickets' priorities, thereby enabling customers to express their problems in natural language without worrying about how to categorize their problems into the limited cardinality of fixed priority levels or set CRM fields.

Figure 3:
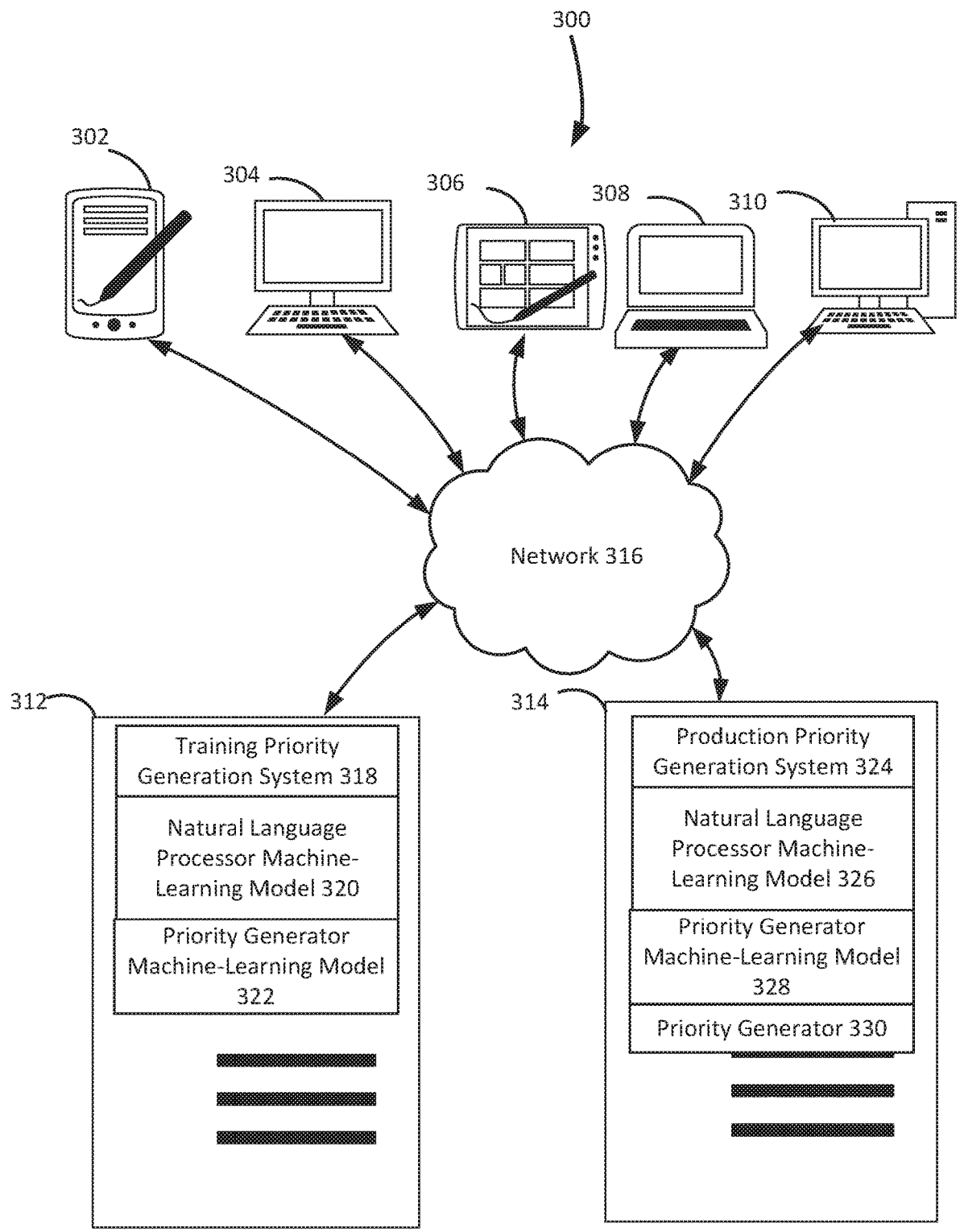
FIG. 3 illustrates a block diagram of an example system for generating priorities for support tickets, under an embodiment.

FIG. 3 illustrates a block diagram of an example system 300 for generating priorities for support tickets, under an embodiment. As shown in FIG. 3, the system 300 may illustrate a cloud computing environment in which data, applications, services, and other resources are stored and delivered through shared data centers and appear as a single point of access for the customers. The system 300 may also represent any other type of distributed computer network environment in which servers control the storage and distribution of resources and services for different client users.

In an embodiment, the system 300 represents a cloud computing system that includes a first client 302, a second client 304, a third client 306, a fourth client 308, a fifth client 310; and a first server 312 and a second server 314 that may be provided by a hosting company. The clients 302-310 and the servers 312-314 communicate via a network 316. The first server 312 may be referred to as the training server 312, and the second server 314 may be referred to as the production server 314. The training server 312 may include a training priority generation system 318, which may include a natural language processor machine-learning model 320 and a priority generator machine-learning model 322. The production server 314 may include a production priority generation system 324, which may include a natural language processor machine-learning model 326, a priority generator machine-learning model 328, and a priority generator 330. The training priority generation system 318 may include the natural language processor machine-learning model 320 and the priority generator machine-learning model 322, or the natural language processor machine-learning model 320 and the priority generator machine-learning model 322 may be combined into one training machine-learning model. Similarly, the production priority generation system 324 may include the natural language processor machine-learning model 326 and the priority generator machine-learning model 328, or the natural language processor machine-learning model 326 and the priority generator machine-learning model 328 may be combined into one production machine-learning model.

Even though FIG. 3 depicts the first client 302 as a smartphone 302, the second client 304 as a terminal 304, the third client 306 as a tablet computer 306, the fourth client 308 as a laptop computer 308, the fifth client 310 as a personal computer 310, and the servers 312-314 as servers 312-314, each of the system components 302-316 may be any type of computer system. The system elements 302-314 may each be substantially similar to the hardware device 500 depicted in FIG. 5 and described below. FIG. 3 depicts the system 300 with five clients 302-310, two servers 312-314, one network 316, two priority generation systems 318 and 324, two training machine-learning models 320 and 322, two production machine-learning models 326 and 328, and one priority generator 330. However, the system 300 may include any number of clients 302-310, any number of servers 312-314, any number of networks 316, any number of priority generation systems 318 and 324, any number of training machine-learning models 320 and 322, any number of production machine-learning models 326 and 328, and any number of priority generators 330. Although FIG. 3 depicts all of the training elements 318-322 residing completely on the training server 312, any or all of the training elements 318-322 may reside completely on the production server 314, or in any combination of partially on the training server 312, partially on the production server 314, partially on the clients 302-310, such as by residing as data management applications on the clients 302-310, and partially on another server which is not depicted in FIG. 3. While FIG. 3 depicts all of the production elements 324-330 residing completely on the production server 314, any or all of the production elements 324-330 may reside completely on the training server 312, or in any combination of partially on the production server 314, partially on the training server 312, partially on the clients 302-310, such as by residing as data management applications on the clients 302-310, and partially on another server which is not depicted in FIG. 3. After training to generate each support ticket's priority, the system 300 may be referred to as the trained system 300.

The training priority generation system 318 trains the natural language processor machine-learning model 320 to provide analysis of a training set of the support ticket communications between the customers who opened support tickets and the support agents who responded to the support tickets, and can use the analysis to determine the priorities of the support tickets. The training priority generation system 318 optionally trains the priority generator machine-learning model 322 to use the analysis to determine the priorities of the training set of support tickets. After sufficient training, the system 300 can deploy the natural language processor machine-learning model 320 and/or the priority generator machine-learning model 322 as the natural language processor machine-learning model 326 and/or the priority generator machine-learning model 328.

Then the production priority generation system 324 uses the natural language processor machine-learning model 326 to provide real-time analysis of the support ticket communications between the customer who opened a support ticket and the support agent who responded to the support ticket. The natural language processor machine-learning model 326 also provides real time analysis of subsequent communications. The production priority generation system 324 can use the priority generator machine-learning model 328 or the priority generator 330 to use the real-time analysis to determine the priority of the support ticket. The priority generator machine-learning model 328 or the priority generator 330 uses the results of the real-time analysis of subsequent communications to update the support ticket's priority periodically to ensure that the support ticket's priority continues to accurately reflect any changes in the support ticket's circumstances. The priority of a support ticket may be expressed as a Needs Attention Score. Since the priority generator machine-learning model 328 and the priority generator 330 are alternative embodiments, the priority generator machine-learning model 328 can execute any of the actions described in this disclosure as being executed by the priority generator 330.

A machine-learning model can be an application of artificial intelligence that provides a system with the ability to automatically learn and improve from experience without being explicitly programmed. A natural language processor can be an electronic component that performs operations on human communications. A communication can be a message. A support ticket can be a request logged on a work tracking system detailing a problem that needs to be addressed. A support ticket communication can be a message related to a request logged on a work tracking system detailing a problem that needs to be addressed. A priority can be a condition of a thing as being more urgent than the conditions of other things. A priority generator can be an electronic component that determines the condition of a thing as being more urgent than the conditions of other things.

The system 300 determines three broad categories of data from analyzing a support ticket's communications, which are the content data, the metadata, and the context data. The content data that is extracted from any type of support ticket communications refers to the language used by a support agent and a customer when they discuss a problem. Content data can be information that is available via an electronic medium. Communications between a customer and a support agent during the lifetime of a support ticket may contain a wide variety of relevant data that can indicate the amount of attention that a support organization should expend on the support ticket. Content data includes information that is associated with a support ticket, such as an impact of a problem associated with a support ticket, a scope of the problem, an entity affected by the problem, an urgency expressed for the problem, a category of the problem, a product associated with the problem. a request for a response to a communication, a reply improbability expressed in a communication, a communication time window, an expressed status of the support ticket, and/or an escalation indicator for the support ticket.

Since a problem can be an issue, an impact of a problem associated with a support ticket can be the severity of an issue which is responsible for initiating a request logged on a work tracking system detailing the issue that needs to be addressed. Customers will often express the impact of the problem they are facing in order to impress that information upon the support organization. The natural language processor machine-learning model 326 can determine a problem's impact from a customer's natural language that details the problem in a manner that is accurate and reliable for the support organization to act upon. By enabling and encouraging customers to express their problem in natural language terms of the impact on their business, a support organization may be better equipped to respond accordingly. For example, the natural language processor machine-learning model 326 determines a high impact from a customer's description of their credit card processing company being unable to process any credit transactions.

A scope of a problem can be the extent of an issue. For example, the natural language processor machine-learning model 326 determines a limited problem scope from a customer's description of their credit card processing company being unable to process any credit card transactions in a test or sandbox environment, because the credit card processing company may not be losing any business due to the restricted extent of the problem. In a contrasting example, the natural language processor machine-learning model 326 determines an extensive problem scope from a customer's description of their credit card processing company being unable to process any credit card transactions in the system that handles all credit card transactions in North America, because the credit card processing company may be losing significant amounts of business due to the vast extent of the problem. The scope of a problem is often related to the impact of a problem.

An entity affected by a problem can be a thing which is impacted by an issue. Customers may indicate that specific entities, such as individuals, teams, and business processes, are affected by a problem, especially if those affected entities are of particular importance. The description of an entity affected by a problem is similar to the description of the impact of a problem, but often has specific and even personal implications. For example, a customer may acknowledge that the reason that a support ticket is opened for a problem is not because the problem is particularly important to their business or that the problem has an effect on their ability to carry out their normal business operations, but because the problem is a personal annoyance to their Chief Executive Officer (CEO). The natural language processor machine-learning model 326 can respond to such an explanation by determining that the customer's CEO is affected by the problem, which results in the priority generator 330 sufficiently increasing the support ticket's priority to draw enough attention to the problem for a support organization to plan how to proceed forward. However, the priority generator 330 does not increase the support ticket's priority so much to adversely affect the allocation of resources to other current support tickets that are more time critical. The production priority generation system 324 may customize the determination of an entity affected by the problem to particular customers, accounts, and users, as well as to incorporate colloquial terms unique to each customer. Determining an entity affected by a problem may also extend to certain teams or operations, such as "Our engineering team is blocked." If a customer writes "This issue is really annoying Mark," then the natural language processor machine-learning model 326 attempts to identify Mark and Mark's role in the customer's company to determine the entity affected by the problem.

An urgency expressed for a problem can be a swift action requirement that is communicated for an issue. Customers often use natural language to express the urgency of their problems in ways that would be very useful for support agents to understand when responding to support tickets. Sometimes this expressed urgency of a problem is asymmetric with the impact of the problem. For example, a customer opens a support ticket, writes in natural language that their company needs an answer to a simple technical question for a legal document, and that the answer is needed by the end of that business day. The natural language processor machine-learning model 326 responds by determining a high urgency expressed for the problem, even though the impact of the problem is low. The production priority generation system 324 can identify a change in a customer's expression of the urgency of a problem by tracking a maximum number of consecutive inbound communications directed from the customer to the support agent. In addition, the production priority generation system 324 can base the change of expressed urgency on the total communications exchanged between a customer and a support agent during a time window as a proportion of the total communications exchanged since the initiation of the support ticket.

A category of a problem can be a type of an issue. Problems differ because some types of problems are naturally more critical or important than other types of problems. This differentiation generally applies to broad categories of problems, such as software crashes or user interface glitches. For example, while some software crashes create problems that are relatively unimportant, and some user interface glitches create problems that are critical, generally software crashes result in more important or critical problems than the problems that typically result from user interface glitches. For example, a customer opens a support ticket and uses natural language to describe the issue they are facing as a software crash, and the natural language processor machine-learning model 326 determines the category of the software crash as an important problem. The natural language processor machine-learning model 326 can take advantage of known historical trends for different problem categories, possibly taking into account how these trends may vary across customer or products, such as identifying the trend of user interface glitches becoming more important, particularly for a specific customer whose business relies significantly on user interfaces.

Since a product can be a manufactured item that was sold or leased, a product associated with a problem can be a manufactured item that was sold or leased and that is experiencing an issue. After a customer opens a support ticket and uses natural language to describe the issue they are having with a product, product feature, or product use case, the natural language processor machine-learning model 326 determines the product that is causing the problem, and uses historical data and/or trends to indicate which products or product features tend to experience critical issues without requiring intimate knowledge of the nature of those products and product features. Therefore, the natural language processor machine-learning model 326 determining which product is experiencing the problem described in the support ticket can enable a support organization to identify when support agents can provide high quality of service without a significant investment in resources. For example, the natural language processor machine-learning model 326 determines that a support ticket describes a problem that a customer has with only one of their user interfaces, that the historical data for user interfaces indicates that rebooting a problematic user interface is an effective solution when the problem is limited to a single user interface, and provides this solution to the support agent who responds to the support ticket.

A request for a response to a communication can be a solicitation of a reply to a message. Since a support agent may be responsible for dozens of support tickets at a time, the support agent may manually read and parse the content of a support ticket to determine whether the support ticket has outstanding requests for additional information or action. Customers make a variety of such requests, ranging from a simple request when a customer checks on progress, such as "Hello, I haven't heard from you in a few days. Do you have any updates on my issue?", to a more direct request, such as "Your latest suggestion did not resolve the problem. What do you suggest we try now?" In addition to detecting these response requests, the natural language processor machine-learning model 326 also determines whether any subsequent responses from the support agent actually responded specifically to the request, and the length of time any unresolved request has been outstanding. For example, the natural language processor machine-learning model 326 detected Chris' request for assistance with a remote mount problem as a request for a response and detected Dana's recommendation of a solution as the requested response, as depicted by FIG. 2.

A reply improbability expressed in a communication can be a message indicating the lack of likelihood for a response to other messages. For example, the natural language processor machine-learning model 326 can detect when a customer broadcasts an out-of-office message indicating that the customer will be unable to respond to any email or other communication for a period of time, such as two weeks. If the natural language processor machine-learning model 326 detects such a reply improbability message, and also an end date to the away period, the priority generator 330 can determine the support ticket's priority that will be used until the customer returns back to their daily duties. Detecting the reply improbability message enables support agents to avoid investing time in communicating with customers who are highly unlikely to respond, so that the support agents can invest their time more wisely in communicating with customers who are waiting for communications from the support agents.

A communication time window can be a chronological period during which a message may be sent. Customers may use natural language to express their communication expectations or commitments in terms of specific time windows. For example, a customer can express a time expectation as "We would like an answer by tomorrow," or express a time commitment as "I will get back to you by Friday." When the natural language processor machine-learning model 326 detects such an expectation or commitment within a communication, the priority generator 330 can use metadata to augment the targeted communication time window, such as determining when "Friday" is, in order to determine the support ticket's priority that will be used until the end of the communication time window. After a customer expresses the time expectation "We would like an answer by tomorrow," the natural language processor machine-learning model 326 detects a communication time window that the priority generator 330 uses to immediately increase the support ticket's priority and continue to increase the support ticket's priority until a response is provided during the expected communication time window. Conversely, if a response is not expected for a very long time, the natural language processor machine-learning model 326 detects a communication time window that the priority generator 330 uses to immediately reduce the support ticket's priority and slowly increase the support ticket's priority close to the expected time of response. The natural language processor machine-learning model 326 may use this logic to infer when a problem is not critical for a customer so that the priority generator 330 reduces the support ticket's priority, such as when a customer says they will respond by a certain time. As time goes on beyond that date without hearing from the customer, the production priority generation system 324 may infer that the customer is otherwise busy and may be left alone without any consequences to their perception of the quality of service received.

An expressed status of a support ticket can be a communicated state of a request logged on a work tracking system detailing a problem that needs to be addressed. Customers will often express their perspective on the status of an ongoing support ticket. For example, a customer writes "It is okay to close this ticket," to inform a support agent that a support ticket may be closed for a variety of reasons, such as the problem was resolved, the problem is no longer an issue, or the problem cannot be reproduced. In an alternative example, after a support ticket's problem has been resolved, a support agents may write that the problem has been resolved, but leave the support ticket open for a few days in order to ensure that the proposed correction to the problem actually resolved the customer's problem. In either situation, the natural language processor machine-learning model 326 analyzes the most recent communication for the support ticket to determine the support ticket status of a pending closure, which the priority generator 330 uses to decrease the support ticket's priority because the customer is not actively waiting for a solution.

When combined with a support ticket's metadata and context data, the production priority generation system 324 can use the support ticket's content to determine the status of the support ticket more fully, including which customer is waiting for a response or in what manner a customer expects a solution for their problem. If the natural language processor machine-learning model 326 determines that a support agent communicates that a solution for a customer's problem is in an upcoming product version, and the customer acknowledges and accepts the timeline for the solution, the support ticket may remain open until the upcoming product version is delivered, but the priority generator 330 can use the determined support ticket status to reduce the support ticket's priority because there is no action for the support agent to take. If the production priority generation system 324 detects the upcoming product version and the product release, the priority generator 330 increases the support ticket's priority when the product is released to ensure that the support agent notifies the customer that the new product version is available, resulting in a prompt closure of the support ticket shortly afterward. This is an example of high quality of service with engagement at only the appropriate times, leading to little or no unnecessary investment of time on the part of support agent or the customer during times of little action.

An escalation indicator for a support ticket can be a suggestion for increasing the resources allocated for a request logged on a work tracking system detailing a problem that needs to be addressed. Many support organizations have a process that is referred to as escalation for handling problems that require special attention. Typically, escalated support tickets require the involvement by a support organization's management and follow service level agreements which specify the increase of support organization resources, how quickly the support organization will respond, how many hours a day the support organization will spend on the problem, and whether the support agents will work over weekends. Furthermore, many support organizations require root cause analysis for many or all escalated support tickets. Therefore, escalations of support tickets bear a significant cost to a support organization due to their high levels of hands-on engagement, often by individuals higher up in management whose time is highly valued by the support organization. Detecting when a customer has indicated their desire to escalate a support ticket offers significant value for a support organization that may be able to avoid those high costs. For example, the natural language processor machine-learning model 326 detects an customer's threat to escalate a support ticket, so the priority generator 330 increases the support ticket's priority, which enables a support agent to react quickly to such a situation, thereby reducing the duration of the subsequent escalation, and even potentially preventing the escalation from ever happening.

The natural language processor machine-learning model 326 provides an efficient user experience by enabling humans to communicate in the modes in which they are naturally most comfortable—that of conventional language. A consequence of the breadth and ease with which humans communicate with one another in natural language is that inferring meaning from a support ticket's content is challenging. Therefore, the natural language processor machine-learning model 326 relies on a multitude of advanced natural language processing techniques, some of which fall under the domain of machine learning model techniques.

The primary input when determining data for a support ticket communication is the content of the support ticket communication. Although the natural language processor machine-learning model 326 is oriented to mining information from text content, a well-performing voice-to-text application would render the natural language processor machine-learning model 326 as useful for voice calls as well. The production priority generation system 324 can use the metadata for support ticket communications in many ways, including as an input with the support ticket's content, which assists in inferring information from the support ticket's content, before using that metadata to specifically generate the priority for a support ticket. For example, the priority generator 330 uses a support ticket's content and the metadata of the prior history of the author of the support ticket to influence the generation of the support ticket's priority, with the metadata reflecting the politeness and directness in communications that vary from person to person, such that the generation of a priority for each person's support ticket takes into account what is known about the person's politeness and directness.

The training server 312 trains the natural language processor machine-learning model 320 to infer tags, labels, or classifiers that may be used to summarize and/or describe the content of input language. This model is trained as an attentional machine learning model to learn not just the weights of the input words and phrases in how they pertain to a classifier, but also which words and phrases are most relevant to predictions of a classifier given the structure of the input words and phrases. The term "attentional" derives from the notion that this technique is, broadly speaking, similar to the manner in which humans choose what to pay attention to when focusing on a task. A customer who is experiencing a catastrophic computer system failure will give far greater weight to the computer system than to the clouds in the sky outside or the carpet in the room. Similarly, an attentional model will give far greater weight to the input that it deems most relevant to the task at the expense of other inputs.

This attentional model technique represents a stark contrast to bag of words models in which all weights for an input have equal importance, and which discards the structure of the input. Attentional predictions are made using a combination of general language models used to infer the syntax (structure and/or organization) of input language and task-specific models used to provide weight to language within the inferred structure. There are several key outcomes of inferring the syntax of language in order to make predictions, in particular determining the role, such as parts of speech, of individual words, as well as the relationship of words and phrases to one another. Using combinations of tagged parts of speech and word or phrasal relationships enables advanced behaviors such as determining whether a word or phrase in particular is being negated, expressed in a conditional or hypothetical manner, or expressed in a specific tense or mood. These advanced behaviors greatly increase the accuracy of text classification on short documents which cause great challenges for conventional methods.

The simplest way in which predictions are influenced by syntactic features is the suppression of key phrases that are negated. Conceptually this negation is straightforward in the example, "This is not a high priority issue." However, in practice the natural language processor machine-learning model 326 is reliant on a general language model that can achieve high accuracy using a technique called dependency parsing, in which direct, binary relationships are established between words in a sentence. For example, in the sentence "This is a small problem," the word "small" is directly related to the word "problem," the word "This" is directly related to the word "is," the word "is" is directly related to the word "a," and the word "a" is indirectly related to both the word "problem" and to the word "This." The dependency chain may be followed to conclude that the word "This" is also indirectly related to the word "problem." Applying the same technique to the more complex example, "This is not a small problem, it is a disaster," determines that the word "it" is indirectly related to the word "disaster," the word "not" is indirectly related to the word "problem," and very importantly that the word "not" is not related to the word "disaster." This attentional model technique provides much more accurate information as to the content of this text than a technique that would simply detect the presence of negative tokens such as "not" and negate any and all predictions pertaining to that text. Returning to the support context, this same attentional model technique excels where other models do not, such as in the following example "This is a high priority issue and your response is not helpful."

Modifying predictions of classifiers for words or phrases that occur within a conditional or hypothetical context is crucial for suppressing would-be problems or outcomes that people naturally and frequently express. For example, technical support customers frequently express concern about problems that may not have actually happened, such as, "If this system had gone down, we would have had a major catastrophe on our hands." Since the customer narrowly avoided a major catastrophe, the support agent may handle the resulting support ticket in a far less urgent manner than if the customer was in the midst of an ongoing catastrophe. Using language-aware techniques enables the natural language processor machine-learning model 326 to suppress language of this type from being surfaced up to or even being sent directly to an inbox of a support organization's upper management. The language-aware techniques result in increased accuracy of the natural language processor machine-learning model 326, and greater confidence by support organizations when the priority generator 330 generates a high priority level for a support ticket. In contrast, a bag of words approach that searches for conditional terms such as would, could, and should, can only identify a small portion of expressions of the subjunctive mood and would unnecessarily suppress predictions when the conditional is unrelated to the key aspects of the language being evaluated, such as "We have a major catastrophe on our hands—we would appreciate a response immediately!"

The natural language processor machine-learning model 326 can use a dedicated machine learning classifier to identify log messages and various categories of machine text on the basis of statistical differences between human text and machine text. Using statistical as well as natural language processing-based methods to extract such pieces of information from the support ticket can enable the natural language processor machine-learning model 326 to focus on processing natural language without being distracted by machine text.

Metadata can be information about information, and metadata for any type of communication refers to information about the communication, rather than the content of the communication. The natural language processor machine-learning model 326 may use metadata for a communication as an input when determining the contribution of communication content or context for the subsequent generation of a support ticket's priority, as described above. In contrast, the use of metadata to directly contribute to the generation of a support ticket's priority is described below. Generally, metadata includes information tangentially related to a communication, such as information about an author of a communication, a viewer of a communication, a time and direction of a communication, a customer account associated with a communication, and an expressed interest in a customer account.

An author of a communication can be the creator of a message. The predominant mode of metadata contribution to the generation of a support ticket's priority may be either directly or indirectly related to authorship of the communication itself. The simplest example of author metadata directly contributing to the generation of a support ticket's priority is whether the author of a communication works for the supporting organization or for their customer. If users are logged into a CRM software website, the production priority generation system 324 may already be able to determine the identity of each user who authors each communication or may determine the identity of each author through other means. The priority generator 330 can use the authorship information to change the direction in which the support ticket's priority is trending. Some communications will increase a support ticket's priority if coming from a customer and decrease the support ticket's priority if coming from a support agent, and vice versa. Another example of author metadata is that of the author's title or role within a customer's company. The mere creation of communications by some individuals that are considered critical to the customer account may indicate that a support ticket is under greater scrutiny from within the customer's company, regardless of whether the customer openly communicates the level of scrutiny. In these instances, if the production priority generation system 324 detects the participation in a support ticket's communications by key individuals on the customer side, this participation suggests that the supporting organization may also want to involve key individuals of their own, such that the priority generator 330 increases the support ticket's priority so that the support ticket receives the attention necessary to involve the appropriate key individuals within the support organization. A creator of a communication can be a person who generated a message.

Since a viewer can be a person who sees something, a viewer of a communication can be a person who sees a message, which is metadata that similar to, but not identical to the metadata for the author of a communication. While still very individual-centric, viewership takes into consideration who is viewing a support ticket. By recording page visits and/or clicks or actions through software, the production priority generation system 324 determines which users are viewing or are otherwise interested in a particular support ticket. If the production priority generation system 324 determines that a support ticket has been viewed by viewers with specific roles, such as drawing many clicks or page visits by a support organization's leaders and/or the customer's leaders, then the priority generator 330 increases the support ticket's priority based on the importance of the leaders who viewed the support ticket. The priority generator 330 can use the viewers of a communication to adjust for factors that are unbeknownst to or not visible from its software and/or services, while still representing the interest level of a support organization and/or a customer, as indicated by the valuable time spent by their leaders. The priority generator 330 can take both the number of viewers and the roles of the viewers into consideration when determining a support ticket's priority. A role can be a position in a company or organization. A number of viewers of a communication can be a count of people who saw a message.

Time and direction of any communication can be information about any recent messages sent to a customer and received from the customer. The existence of a support ticket communication is metadata that is input to generate a support ticket's priority. For example, if the production priority generation system 324 has determined that a customer is waiting for a response from a support agent, the subsequent detection of an outbound communication from the support agent to the customer should cancel out some or all of the contribution to the support ticket's priority which is due to the customer waiting for a response. In contrast, if the production priority generation system 324 has determined that a customer is waiting for a support agent to respond and detects yet another communication from the customer without detecting a response from the support agent, the priority generator 330 increases the support ticket's priority even further as the customer grows increasingly impatient. This communication time and direction information is also a useful input when taken into consideration with the previous history for this support ticket and/or previous support tickets for this customer. For example, the production priority generation system 324 has determined that many or all of the last several consecutive communications are inbound from a customer, and detects another inbound communication is received from the customer, the production priority generation system 324 infers that the customer is paying more attention to the problem than the customer is receiving from the support agent, and the priority generator 330 increases the support ticket's priority to ensure that support resources are allocated to more closely match the customer's expected level of support. The same process may be done in reverse; if the production priority generation system 324 has determined that most of the recent communications are outbound, and infers that the support agent is allocating more resources to the support ticket than the customer is able to match, then the priority generator 330 reduces the support ticket's priority, so that this reduced priority can guide the support agent to reduce their resource allocation for the customer in order to focus on other support tickets while still meeting the customer's expectations for support. Another direct contribution comes from the time of day and/or the day of the week when the customer generates a communication for a support agent. For example, if a customer's employee who is usually active during conventional business hours, such as 8 A.M. to 5 P.M. at their local time, generates a communication at 1 A.M. their local time to a support agent, the production priority generation system 324 infers that the customer employee is in the midst of an emergency for which they require immediate assistance, and the priority generator 330 increases the support ticket's priority to ensure that this immediate assistance is provided. Considering that many business conduct operations with employees working around the world, the production priority generation system 324 performs this calculation on a per-user basis rather than on a per-customer basis, taking into account the user's local time zone, which may be predicted using heuristics, if not known from other sources. The production priority generation system 324 can also evaluate the promptness of a support agent's response based on the support agent's time zone and/or the difference between a customer's time zone and the support agent's time zone.

A customer account associated with a communication can be a formal business arrangement with a purchaser of a product or service which is related to a message. From a support organization's perspective, not all of its customer accounts are created equal, because the distribution of product and/or services dollars often varies greatly across customer accounts, such that the amount of resources allocated by the support organization to those customer accounts varies to ensure that the support organization is being run profitably. The priority generator 330 uses both contextual account factors, which are described later, and metadata for a customer account to generate a support ticket's priority. One type of metadata for a customer account is the size, measured in revenue or potential revenue, of a customer account, because higher-revenue accounts typically receive more support resources. Many support organizations also offer multiple tiers or packages of support and services that explicitly indicate different expected response times and/or windows associated with different price points. For example, a support organization offers free or low-price support during typical business hours, such as 8 A.M. to 5 P.M. on Mondays to Fridays, and a higher priced support offering that includes 24-hour, 7-day response windows. Similarly, the low-price offering may promise a response within 24 hours, whereas the higher-priced offering promises response times within four hours. By taking a customer account's support levels into consideration, the priority generator 330 increases the support ticket's priority when the customer expects a response based on their account's specific support entitlements and decreases the support ticket's priority for customers whose accounts are not entitled to receive a response soon. For example, after two identical support tickets are opened on a Saturday morning by two different customers whose accounts have two different support entitlements, the priority generator 330 increases the support ticket priority for the customer account with the weekend support entitlements to ensure that a support agent responds despite the time being outside of conventional work hours. In contrast, the priority generator 330 decreases the support ticket priority for the customer account without the weekend support entitlement to ensure that a support agent does not respond too early. However, once the next business day arrives, the priority generator 330 increases the support ticket priority for the customer account without the weekend support entitlements to the support ticket's normal priority level.

Expressed interest in a customer account can be a conveyed desire to know about a formal business arrangement with a purchaser or leaser of a product or service. The production priority generation system 324 can use software that enables individuals or businesses to indicate preferred or favorite customer accounts to infer that some customer accounts are of particular interest to an individual or a business regardless of other customer account factors, such as revenue and service level. If individuals in a support organization indicate an interest in a customer or the customer's account, and a support ticket is received from the customer of interest, then the priority generator 330 increases the support ticket's priority to represent that level of interest. For example, a senior executive in a support organization uses system software to indicate that he had a college roommate who is the current representative of a customer that has an account with the support organization, which is type of fact that is not typically reflected in CRM software. Since the production priority generation system 324 interprets this indication as the support organization's senior executive wanting their former college roommate to be happy, the priority generator 330 generates high enough priorities for this customer's support tickets that result in otherwise undue attention for this customer's problems. Enabling support organization users to define their customer account relationships provides for a level of flexibility and general awareness that is not possible through more constrained and conventional CRM software.

The production priority generation system 324 may use different ways to identify the role of an individual user, which is described above as being used in multiple ways, such as simply asking the system user, which is possible when the user logs in to the system software. Another way the production priority generation system 324 identifies the role of an individual user is to use their title or role as defined in their CRM or support software, as long as this data is in a format that is the production priority generation system 324 can parse or understand. The production priority generation system 324 may also use additional services to provide this role data, including using paid services that explicitly provide lookups for individuals with well-defined histories, such as directors, vice presidents, or executives. Multiple internet services provide these types of lookups, such as LinkedIn and Clearbit.

There are multiple ways in which the priority generator 330 can use metadata to generate a support ticket's priority, including but not limited to those listed above. Mathematically, some uses may include additions, subtractions, multiplications, divisions, and may induce exponential or logarithmic growth or decay. Additionally, the priority generator 330 can use metadata as modifiers in the analysis of content data and/or context data, and can use metadata as modifiers when combining those contributions with other contributions towards generating the priority of a support ticket in later stages of the priority generation process.

In addition to using the content data and the metadata to generate a support ticket's priority, the priority generator 330 also uses the context data from the context in which a communication occurs to generate a support ticket's priority that is both accurate and useful for a wide variety of users in a wide variety of situations. Context data covers both the context of the original communication as well as the context in which the communication is subsequently viewed and/or analyzed. There are numerous ways in which the context of a single instance of communication between a support organization and a customer may be used to generate a support ticket's priority. These ways may be divided into two broad categories: context within a support ticket and context outside of or across multiple support tickets.

A context within a support ticket can be the circumstances that form the setting for a request logged on a work tracking system detailing a problem that needs to be addressed. The timing of a communication is an important component of a support ticket's context, which the production priority generation system 324 can use when evaluating how well a support organization is handling a support ticket. For example, a supposedly perfect response to a customer's question that arrives after the customer has been waiting for six months is unlikely to be as satisfying for the customer as an adequate response that arrives before the customer has been waiting for an hour. This example demonstrates how the priority generator 330 needs to consider the time of a communication, which could be considered simple metadata, in the context of previous communications within the support ticket to determine the effect of timing on the generation of a support ticket's priority.

There are multiple ways in which the priority generator 330 can use the timing of a communication relative to the timing of previous communications to generate a support ticket's priority. The production priority generation system 324 can use the authorship metadata of a previous communication, which specifies whether the previous communication was sent by or to a customer, to infer whether the customer or a support agent is currently waiting for the next communication to arrive. The production priority generation system 324 can infer who is currently waiting for the next communication based on the ratio or relative number of inbound and outbound communications in the recent past for the current support ticket, and may compare this current ratio to the global or historical ratio of inbound to outbound communications in order to more accurately make this inference. The production priority generation system 324 can calculate the ratio of inbound and outbound communications on a rolling-window basis when inferring who is currently waiting for the next communication. The production priority generation system 324 can also infer who is waiting for the next communication based on the content of the most recent communication, such as detecting the content "I am waiting on you." Similarly, while the priority generator 330 can use metadata pertaining to an author of an individual piece of communication as input to generate a support ticket's priority, authorship metadata as it pertains to the prior or existing context of a support ticket can also be a valuable input.

The production priority generation system 324 can track the number of participants in a support ticket so that the priority generator 330 can increase a support ticket's priority when the number of participants increases or crosses certain threshold values. When tracking the number of participants in a support ticket, the production priority generation system 324 can also take the communication roles of the participants into consideration. For example, the production priority generation system 324 can infer a much higher visibility from five different participants in the first ten communications for a support ticket relative to a support ticket with five participants spread across fifty communications. A number can be an arithmetical value representing a particular quantity and used in counting and making calculations. A participant can be a person who takes part in an activity.

The priority generator 330 can also take into consideration the relative number and roles of participants from within the customer organization and the support organization, because the participation by some individuals who are considered critical to a customer account may indicate that greater scrutiny is being placed upon the support ticket from within the customer's company, regardless of whether they openly communicate the level of scrutiny. In such situations, the detection of participation from key individuals in the customer's company suggests that the supporting organization may also want to involve key individuals of their own, such that the priority generator 330 increases the support ticket's priority so that the support ticket receives the attention necessary to involve the appropriate key individuals within the support organization. An organization can be a group of people with a particular purpose, especially a business.

The context across multiple support tickets can be the circumstances that form the settings for requests logged on a work tracking system detailing problems that need to be addressed. The priority generator 330 can improve the accuracy of the support ticket's priority by expanding the number of its inputs to include inputs from other support tickets, especially for business-to-business support or other types of support in which the same customers (either by account or individual) communicate with the support organization many times during the lifetime of their relationship. One mode of this context is the history of the customer who created a support ticket communication, both for the customer account as a whole (in this case of a large business that may have multiple people interfacing with the support organization) as well as at the individual level. A history can be a record of past events. A customer can be a purchaser or leaser of a product and/or a service.

For example, in addition to using the current amount of time that a customer is waiting on a response from a support agent, the priority generator 330 can also base a support ticket's priority on historical response times particular to that customer. The use of historical response wait times is based on the premise that some customer accounts or individuals may be willing to wait more or less time for a reply from a support agent, depending on a multitude of factors which include the customer's relationship with the support organization, the customer's role within the customer's organization, and the customer's individual personality. By performing analysis on historical response wait times, potentially augmented by the sentiment detected within a communication's content, the production priority generation system 324 can customize the contributions used to generate the support ticket's priority, based on the desires and expectations of the particular individuals and the customer involved in each support ticket. Since some customers expect responses more quickly or slowly than other customers, the priority generator 330 can more closely align the support ticket's priority with the history of customer expectations, resulting in a more efficient allocation of support resources while maintaining expected quality of service for each customer.

The priority generator 330 can extend a similar process of customization to any or all of the aforementioned content and/or metadata factors to normalize a support ticket's priority based on customer expectations. For example, the priority generator 330 normalizes the metadata of the number of participants in a customer's support ticket, which could have different weight or different thresholds for the numbers of individual customers participating, by taking into consideration the historical trends of the number of participants in the customer's previous support tickets.

The priority generator 330 can also take into consideration other factors of customer history, such as the historical product problems that this customer has experienced, historical sentiments expressed by the customer, historical perceived quality of support received, historical support ticket resolution time, and the history of the individuals who interact with the support agents. For example, a customer is experiencing an abnormally large number of problems with a product relative to the number of problems that the customer previously experienced with the product, and the priority generator 330 generates a high priority for the customer's support ticket to alert the support organization's management. Continuing this example, management reviews the previous support tickets for the product and contacts the customer to ensure that the customer is still satisfied with the product and the support that the customer is receiving. By normalizing current customer factors based on historical customer factors, the production priority generation system 324 may identify customers that are in danger of terminating or not renewing their support contract, as well as identifying customers who are increasingly relying on their product(s) or service(s), which presents new opportunities for sales. A historical product problem can be a past issue with a purchased item.

Additionally, the priority generator 330 may use historical statuses of a customer's historical support tickets based on whether the support organization considered the historical support tickets to be closed, which indicates that a ticket is resolved or inactive, or to be still open, which indicates that a ticket is unresolved or active. If a customer has an abnormal large number of support tickets open at one time, relative to the customer's historical patterns of open support tickets, the priority generator 330 generates high priorities for the customer's current support tickets to guide the support organization's management towards taking action to ensure that the customer is pleased with the support that the customer is receiving and with the product. A historical status can be a past condition. A historical support ticket can be a past request logged on a work tracking system detailing a problem that needed to be addressed.

The production priority generation system 324 can accurately characterize the sentiment associated with a support ticket by analyzing the content of the communication, not only by detecting individual expressions of sentiment, but also by computing an overall sentiment score for the exchange of communications. The production priority generation system 324 can use natural language processing to extract indications of a customer's sentiment, such as impatience, frustration, sense of building urgency, and/or references to production issues from the customer's support ticket communications. The priority generator 330 can use historical sentiments to extend the process of customization to any or all of the aforementioned data. For example, the priority generator 330 uses a customer's history of rude communications to reduce the contribution towards the priority for the customer's support ticket which is made by the metadata reflecting the customer's rude communications that express a perception of a low quality of support received. A historical sentiment can be a past attitude towards a situation or an event.

The priority generator 330 can also take into consideration additional factors of customer context from outside the support organization purview that are still highly informative in terms of generating an accurate and relevant priority for a support ticket. The priority generator 330 may use sales information pertaining to a customer account from a sales team's perspective because sales teams are keenly interested in the relationships of their customers, and are able to provide input that cannot be gleaned from support tickets, such as data from personal conversations or phone calls, no matter how formal or informal. For example, a customer account manager discovers that a customer is evaluating alternatives to their product, uses CRM software to set a flag which indicates that the customer's account is in danger of being lost, and the priority generator 330 uses this CRM flag to generate high priorities for all of the customer's support tickets, which results in quicker support for the customer's support tickets and an improvement in the customer's perception of the support organization and its products. Sales information can be data about potential transactions.

Support organization personnel can set similar flags for the contract statuses of customers who are in the midst of contract renewals or are up for renewals soon, for customers who are in a trial period or evaluation period, and for very new customers. For example, the priority generator 330 detects a flag which indicates that a customer has opened their first support ticket, and generates a high priority for the support ticket to ensure that high-quality support resources are allocated to the customer's first support ticket, leaving the new customer with a positive first impression. In another example, the priority generator 330 detects a flag which indicates that a customer who opened a support ticket is still in a trial period for their service level agreement, and generates a high priority for the support ticket to ensure that the support ticket receives an inordinate amount of attention and resources by support agents, which maximizes revenue by convincing the customer to sign a long-term contract. A contract status can be the condition of a sales agreement.

A context of a prospective viewer of a priority of a support ticket can be the circumstances that form the setting for a person who is expected to see the level of importance for a request logged on a work tracking system detailing a problem that needs to be addressed. There are several ways that the context in which the priority generator 330 presents a support ticket's priority can affect the priority or the presentation of the priority. The priority generator 330 can use expressed interest to adjust the priority for a support ticket and display the adjusted priority to the system user who is a prospective viewer of the support ticket's priority and expressed the interest in the customer account associated with the support ticket. For example, the production priority generation system 324 detects information which indicates that the support agent supervisor Bob is interested in the customer Ann's account and that the support agent Dana is interested in the customer Chris' account, increases the priority of Ann's support ticket when displayed on Bob's list of open support tickets and increases the priority of Chris' support ticket when displayed on Dana's list of open support tickets, and alerts Dana about Chris' support ticket. The same effects on priority and the presentation of priority extend to the personal viewership or other product usage patterns of individuals, which are gleaned from user telemetry via a web application or other software service. By inferring patterns in individuals' preferences for viewership as a proxy for interest, the priority generator 330 can adjust the priorities for a support ticket in which these individuals will be interested as prospective viewers, based on the similarity of the support ticket to other support tickets that are recorded as viewed in the individuals' viewing history. Interest can be a desire to know about a formal business arrangement with a purchaser of a product or service. An adjusted priority can be a modification of a condition of a thing as being more urgent than the conditions of other things. A system user can be a person who operates a computer. A prospective viewer can be a person who is expected to see.

These effects on priority and the presentation of priority may also extend to individuals across organizations and at the organization level based on the role of a prospective viewer of the priority. For example, the priority generator 330 increases the scores of support tickets for sensitive or important customer accounts and decreases the scores of support tickets which require a support agent's response when displayed as scores on a sales user's list of open support tickets, partially because the sales user has limited resources or ability to take action on support tickets which require a support agent's response. The priority generator 330 can change the format for displaying the priority for a support ticket based on the prospective viewer of the priority, such as presenting entirely different priority formats for users the farther they deviate from the core support use case—including showing categorical or even simplified red, yellow, and/or green indicators for customer account representatives or high-level executives who may not desire a greater level of detail about a support ticket's priority.

After the natural language processor 330 determines the content data, the metadata, and the context data for a support ticket's communication, the production priority generation system 324 processes the content data, the metadata, and the context data as applicable. This processing of data may be compared to data transformation processes such as precomputation, preprocessing, and/or aggregation of some of the data determined for the support ticket communication before the processed data is passed on to be converted to different impulses in various channels, which convert the impulses into channel values that are used to generate the support ticket's priority. Processing the data within the categorical data boundaries of content data, metadata, and context data increases the relevance of the data that is provided for conversion to impulses, which simplifies the conversion process and increases the probability of training or otherwise determining a model that is likely to be both accurate and relevant. For example, the production priority generation system 324 processes the metadata which identifies the author of a support ticket to produce a simpler feature vector, such as is manager, or is vice president. The potential space of these Boolean (true/false) values is much smaller than the set of all user identifiers, thereby making the simple feature vector much more likely to be a relevant feature to the impulse conversion process than just returning the identifier of a system user and expecting a machine learning model to infer the relative importance of that user identifier within a customer's organization.

After determining the content data, metadata, and context data for each detected event, such as a support ticket communication or the lack of an expected communication, and processing the content data, metadata, and context data, the production priority generation system 324 converts the processed data to impulses. These impulses may be similar to the Dirac delta function in signal processing, where each impulse is a signal with a variable magnitude or height and a duration or width of zero. The production priority generation system 324 subsequently uses an impulse-channel model to receive the processed content data, metadata, and context data as impulses, and then converts these impulses into channel values based on each channel's inputs and behavior, so that the channel values may be used to generate the priority for a support ticket. An impulse can be a signal that conveys information. A channel can be a medium for passing information.

For example, the production priority generation system 324 detects the communication "I still need help! It doesn't solve the problem!" 202 as a follow-up request, because the communication 202 is subsequent to a first communication that requests assistance with a remote mount problem and a second communication that recommends a solution to the problem, as indicated in the support ticket 200 that is depicted in FIG. 2. The production priority generation system 324 determines that the metadata for the communication 202 identifies the requester as a customer's manager named Chris, and the context data for the communication 202 is used to classify Chris' sentiment as unusually frantic. Then the production priority generation system 324 converts the follow-up request, the identification of the requester as a manager, and the classification of the requester's sentiment as unusually frantic into to impulses which correspond to the point in time of the communication 202.

Converting processed data to a range of impulses simplifies the channels' subsequent aggregation and conversion of these impulses while retaining overall system complexity and expressed subtlety, since each channel maintains independent state according to highly specific impulses as opposed to acting upon broader and potentially more generic impulses. Furthermore, each channel may react differently in response to similar input impulses, may behave differently as they approach or exceed saturation points, and may contribute to the overall score by a weighted factor specific to that channel. An example of metadata converted to an impulse is when the production priority generation system 324 detects the presence of a communication, regardless of the communication's content, such as when an inbound communication arrives, and the metadata is converted to an inbound communication activity impulse. Another example of metadata converted to an impulse is when the production priority generation system 324 detects the addition of a participant, such as when a new person communicates about a specific support ticket for the first time, and the metadata is converted to a new-participant impulse. The production priority generation system 324 may even generate impulses based on a lack of activity, such as when zero communications occur for a duration of time. For example, when the response time that is required by a service level agreement for a support agent's response terminates without the support agent responding, the production priority generation system 324 may generate a lack-of-activity impulse and/or a service-level-agreement-violation impulse. Consequently, when detecting a support ticket event, the production priority generation system 324 can detect either a communication or the lack of an expected communication for a support ticket. Impulses for content data also have interaction with impulses for metadata and impulses for context data.

The production priority generation system 324 may execute both when a new event occurs for a support ticket, such as when a customer generates a new communication, and at a specified frequency, such as every two hours, as time dependent factors may cause the support ticket's priority to change even when there is no support ticket activity. For example, when a support agent has not responded to a customer's question for two hours, the priority generator 330 generates an increased priority for the support ticket. When an event occurs, the production priority generation system 324 can determine the necessary data from a support ticket, subsequent data related to the support ticket, and/or previous data related to the support ticket, and then generate an updated priority for the support ticket. Therefore, the priority generator 330 can generate the priority of a support ticket based on data related to the support ticket at initiation and/or subsequent to the initiation of the support ticket.

When converting content data to an impulse, the production priority generation system 324 can use metadata to determine the magnitude for the impulse. For example, the production priority generation system 324 converts the part of the content from the part of the communication "I still need help!" 202 to a customer-waiting impulse, and then generates the magnitude of this impulse based on the metadata that identifies the author of the communication 202. The production priority generation system 324 may generate greater magnitudes for the customer-waiting impulse for the customer-waiting channel and the participants impulse for the participants channel if the author has a high-level role or title within the customer's organization, and may generate lesser magnitudes for the customer-waiting impulse and the participants impulse if the author is regularly impatient or rude when communicating, indicating that this behavior is more routine than extraordinary and thus may not require inordinate attention on the part of support agents. Even if the production priority generation system 324 generates a lesser magnitude for the customer-waiting impulse, the lesser magnitude may still be greater than zero, such that the priority generator 330 can use other means more directly focused on customer history to increase the priority of support tickets opened by frequently impatient or rude customers, ensuring that such customers still receive adequate care.

Following the determination of the content data, metadata, and context data for each detected event, the processing of the content data, metadata, and context data, and the conversion of the processed data to impulses, the production priority generation system 324 inputs the impulses to a variety of channels, with each channel pertaining to a specific category of customer behavior or interest. The channels subsequently use different types of conversions to convert their signals to channel values, which are then used to generate the priority for a support ticket. Each impulse may contribute to one or more individual channels, which are subdivisions of the priority for a support ticket or sub-scores within the Needs Attention Score universe.

The production priority generation system 324 can have channels for many customer behavior categories or customer interest categories which are associated with support tickets, such as customer-waiting (a current wait by a customer for support), a response time, an account history, a communication activity, participants associated with communication activity, a problem scope, a problem impact, customer-sentiment, and problem-solved. A current wait by a customer for support, or customer-waiting, which is associated with a support ticket can be a purchaser or laser expecting service from a service agent, such that a customer-waiting channel holds the impulse for how long the customer has been waiting for a communication from a support agent. A response time associated with a support ticket can be when a service agent replied to a customer, such that a response time channel holds the impulse for how long a customer had been waiting when a support agent responded. An account history associated with a support ticket can be previous cases created by a purchaser or leaser, such that an account history channel holds the impulse for how long a customer waited for resolution to their previous problems.

A communication activity associated with a support ticket can be incidents of messages related to a case, such that a communication activity channel tracks the impulses that represent one or more parameters pertaining to content and metadata related to the relative quantity, frequency, and order of communications for a support ticket. The production priority generation system 324 can identify the magnitude of communication activity based on the total number of support ticket communications normalized with respect to the support ticket's age, grouped by both inbound frequency of support ticket communications and outbound frequency of support ticket communications. The production priority generation system 324 can track a support ticket's age based on the time elapsed between when the support ticket was initiated until the current time. Participants associated with communication activity associated with a support ticket can be people who create or view messages that are related to a case, such that a participants channel holds the impulse pertaining to the metadata and context of people who create or view support ticket communications, including but not limited to the quantity of people who create or view the support ticket and their role within their respective organizations. A problem scope associated with a support ticket can be the extent of the issue of a case, such that a problem scope channel holds the impulse for the magnitude of the extent of the customer's problem. A problem impact associated with a support ticket can be the severity of the issue of a case, such that a problem impact channel holds the impulse for the magnitude of the severity of a customer's problem. A customer-sentiment associated with a support ticket can be a purchaser or leaser expressing an attitude about a problem, such that a customer-sentiment channel holds the impulse for the magnitude of the customer's negative feelings about a problem. A problem solved associated with a support ticket can be the resolution of the issue of a case, such that a problem solved channel holds the impulse for the magnitude of the resolution of a customer's problem.

Each impulse may contribute to one or more channels. For example, in response to detecting a Follow-up Request event, the production priority generation system 324 converts the resulting data to an impulse that contributes positively to the communication activity channel and an impulse that contributes positively to the customer-waiting channel. If the customer did not indicate any particular urgency, impatience, or negative sentiment, the production priority generation system 324 may contribute a meaningful but relatively small impulse to the customer-waiting channel. However, if the customer had stated "We have been waiting for a response for far too long," the production priority generation system 324 would have contributed a much greater magnitude impulse to the customer-waiting channel. As a result, the customer-waiting channel would receive a far greater increase in impulse, such that the priority generator 330 would increase the priority of the support ticket as a result.

Once the production priority generation system 324 determines the content data, metadata, and context data for each detected event, processes the content data, metadata, and context data, converts the processed data to impulses, and inputs the impulses to a variety of channels, the channels use different types of conversions to convert their signals to channel values that are subsequently used to generate the priority for a support ticket. Each of the channels has its own behavior, such as sensitivity to new inputs, saturation points and saturation behavior, and decay or growth across time. A channel can use some prior state in addition to new inputs to calculate channel values, depending on the behavior of that channel. A type can be a category of a thing. A conversion can be the process of changing something from one form to another form. A channel value can be information in a medium that passes information.

Channels typically grow or decay their channel values over time, absent any new inputs. For example, the customer-waiting channel would continue to increase the customer-waiting channel value over time until the support organization responds. A software service that executes periodically can calculate these increasing channel values to ensure that the channel values are accurate regardless of whether or not a channel receives a new impulse from a newly detected support ticket event. In this example, each time that the software service executes, a new customer-waiting channel value is calculated based on its current state. Since the current state entails the customer's unanswered expression of impatience, the software service would likely continue to increase this customer-waiting channel value as time passes until the support organization responds.

How a channel's value increase depends on the channel's behavior. Some channel may increase their channel values linearly, while other channel may increase their channel values sub-linearly (growing less each time) or super-linearly (growing more each time). The channels may achieve these increases through linear, logarithmic, and exponential/geometric mathematical operations, respectively. Some channels may increase their channel values according to historical trends, such as percentile cutoffs. For example, a customer-waiting channel may not increase its channel value at all until the elapsed time that the customer is waiting for a support agent to respond to the customer's most recent communication reaches a 50th percentile cutoff, at which point the channel can use a set additive or a multiplicative value to sharply increase the channel value, and may not increase the channel value again until the next event is detected. The channels enable the definition of arbitrary but potentially complex channel behavior. A channel may decrease a channel value in various ways, such as by adding a negative value to the channel value, multiplying the channel value by a value less than one, and raising the channel value to a power less than one.

In order to prevent a channel value from becoming excessive or making an excessive contribution to generating a support ticket's priority, a channel can saturate, which means that the production priority generation system 324 limits a channel value to a maximum amount that the channel value can contribute to generating the priority for a support ticket. In one type of saturation behavior, the production priority generation system 324 enables an internal representation of a channel value to increase beyond its saturation point, which allows for channels to saturate longer. For example, if a channel saturates at a channel value of 10 and decays at a certain rate, and the production priority generation system 324 enables the channel value to rise to 15, then the channel value will subsequently take much longer time to decay below 10. Enabling a channel value to exceed its saturation point is useful for channels which have channel values that do not change much throughout the life of the support ticket, such as the problem impact channel. In another type of saturation behavior, the production priority generation system 324 caps the internal representation of the channel value at the saturation point, which means that some highly dynamic channel values will quickly decay, such as the customer-waiting channel's value may quickly decay once the customer is no longer waiting for a response from a support agent.

After determining the content data, metadata, and context data for each detected event, processing the content data, metadata, and context data, converting the processed data to impulses, inputting the impulses to a variety of channels, and using different types of conversions to convert their impulses to channel values, the priority generator 330 uses the channel values to generate the priority for a support ticket. The production priority generation system 324 organizes impulses into channels so that the logic of converting data from detected support ticket events into contributions to the support ticket's priority is distributed into multiple processes, which reduce the logic's complexity in any one process and increases the ability to generate and update a support ticket's priority across a variety of customer environments. The logic of converting data from a support ticket's events into processed data, processed data into impulses, impulses into channel values, and channel values into a support ticket's priority is non-trivial at every conversion, and significantly more tunable and scalable than directly converting raw data from a support ticket's events into numerical contributions for the support ticket's priority. The priority generator 330 generates a support ticket's priority automatically and in near-real-time through automated analysis of support ticket communications with customers, and potentially through an integration with their support organization's CRM software/service. The priority generator 330 generates a support ticket's updated priority when a new support ticket event occurs and/or at periodic time intervals to capture the increasing time elapsed since the most recent support ticket communication.

The priority generator 330 can combine channel values to generate a support ticket's priority by using a variety of methods for a variety of different scenarios or contexts. One method for combining channel values is a simple additive process by which the priority generator 330 simply sums and potentially normalizes channel values to a desired range for routine consumption. When using this summation method, the priority generator 330 can add a baseline value to the channel values in order to normalize behavior when there is very little noteworthy activity or context for a given support ticket. For example, the priority generator 330 uses a baseline value of 30 for the Needs Attention Score scale of 0 to 100. In one scenario in which a support ticket has a communication activity channel value of +4, a participants channel value of +6, and a customer-waiting channel value of −2, the priority generator 330 simply sums these values for a Needs Attention Score of 38.

However, a simple summation method may be insufficient in some scenarios, especially when one or more channels have extreme channel values, particularly those channel values that have interactions with one another. For example, if the customer-waiting channel is fully saturated with a value of +20, and the account history channel is also fully saturated with a value of +10, the priority generator 330 may scale these channel values to create an even greater increase in the Needs Attention Score than +30. In this situation, the priority generator 330 generates a customer-waiting plus context sub-score that either adds a set value or multiplies the channel values when one or both of these channels are saturated. In this case, when both channels are saturated, an additional +10 may be added to the final score in order to further incentivize support activity on the support ticket.

The channels could calculate this complex combination of channel values, but by the priority generator 330 performing this logic after the channels calculate the channel values, the priority generator 330 can generate priorities that are accurate in subtle scenarios and with complex interactions, but without compromising individual channel values. For example, the priority generator 330 can multiply one channel value based on another channel's saturation status to generate a support ticket's priority. The priority generator 330 can combine channel values directly through mathematical operations, such as linear combinations. In this scenario, all channel values may be connected to one another and multiplied by other mathematical values.

Determining which method is the most accurate way to combine channel values to generate a specific Needs Attention Score for a specific support ticket may be achieved by the training priority generation system 318 training the priority generator machine learning model 322 to infer or learn the values by which the channel values should be multiplied, as well as the potential combinations of the channel values to also multiply. Training the priority generator machine learning model 322 can include enabling end users to make corrections or otherwise label the Needs Attention Scores as being accurate or not, and then provide a new value they perceive to be the accurate score for that scenario. The training priority generation system 318 can feed such these labels into the priority generator machine learning model 322, which identifies the support ticket events and/or channel values at the time of the label, and then learns a representation of the internal mathematical operations as outlined above, such as by using decision trees, random forests, simple vector machines, Bayesian methods, gradient boosted classifiers, k-nearest neighbor classifiers, neural networks, support vector machines, naive Bayes classifiers, logistic regression models, and other machine learning techniques. After the training priority generation system 318 completes the training of the priority generator machine learning model 322 and/or the natural language processor machine learning model 320, the production priority generation system 324 deploys the sufficiently trained priority generator machine learning model 328, and/or the natural language processor machine learning model 326.

The following examples describe the training priority generation system 318 using a training set of support ticket communications to generate a priority of a support ticket, and the production priority generation system 324 using real-time support ticket communications to generate the real-time priority of a support ticket. These descriptions are offered for illustrative purposes only and are not intended to limit the scope of this disclosure or to depict a real-world example. For the training example, the training priority generation system 318 receives a training set of support ticket communications, which includes the support ticket 100 that contains all subsequent communications 102 and the support ticket's metadata 104, as depicted by FIG. 1. Then the training priority generation system 318 trains the natural language processor machine learning model 320 to determine data for the support ticket's first communication, including content data which contains a request for help with a remote mount problem, metadata which identifies the requester as a customer's manager named Ann, and context data which is used to classify the sentiment of Ann's request as unusually desperate. The training priority generation system 318 converts the content data for the request for help into a follow-up request impulse that has a magnitude of +4 in the customer-waiting channel. The training priority generation system 318 converts the content data for the remote mount problem into a remote mount impulse that has a magnitude of +1 in the problem scope channel, and a remote mount impulse that has a magnitude of +1 in the problem impact channel. The training priority generation system 318 may automatically determine impulse magnitudes of specific entities derived from content data based on historical support tickets from that support organization and/or others.

The training priority generation system 318 converts the metadata identifying the requester Ann into an is manager impulse that has a magnitude of +3 in the participants channel because the participant is a manager, and an an manager-waiting that has a magnitude of +4 in the customer-waiting channel, because the customer who is waiting is a manager. The training priority generation system 318 converts the context data which classifies the request's sentiment into a unusually desperate impulse that has a magnitude of +2 in the participants channel, because the customer who is waiting is desperate.

The channels simulate the passage of the two hours prior to the next event and convert their impulses into channel values. The customer-waiting channel converts the follow-up request impulse that has a magnitude of +4, the is manager-waiting impulse that has a magnitude of +4, and a two hour incrementation value of +2 into the customer-waiting channel value of +10. The participants channel uses the is manager impulse that has a magnitude of +3 and the unusually desperate impulse that has a magnitude of +2, which is not changed by the passage of two hours, for a channel value of +5. The problem scope channel uses the remote mount impulse that has a magnitude of +1 which is not changed by the passage of two hours for a channel value of +1. The problem impact channel uses the remote mount impulse that has a magnitude of +1 which is not changed by the passage of two hours. for a channel value of +1 Then the priority generator machine learning model 322 aggregates the customer-waiting channel value of +10, the unchanged participants channel value of +5, the unchanged problem scope channel value of +1, the unchanged problem impact channel value of +1, and the baseline value of 30 to generate a Needs Attention Score of 47.

The training priority generation system 318 trains the natural language processor machine learning model 320 to determine data for the support ticket's second communication, including content data which contains a recommended solution for the remote mount problem, metadata which identifies the recommender as a support agent supervisor named Bob, and context data which infers that the support agent supervisor is waiting, based on the sequence of one customer request followed by one support agent supervisor recommendation. The training priority generation system 318 converts the content data for the recommended solution into a requested follow-up impulse, the context data for a support agent supervisor is waiting into a support waiting impulse, and then combines the requested follow-up impulse and the support waiting impulse into a support followed up impulse in the customer-waiting channel. The training priority generation system 318 converts the metadata which identifies the recommender Bob into an is support agent supervisor impulse that has a magnitude of −3 in the participants channel.

The channels simulate the passage of the 15 minutes prior to the next event and convert their impulses into channel values. The customer-waiting channel uses the support followed up impulse and the previous customer-waiting channel value of +10, which is not changed by the passage of 15 minutes, for an updated customer-waiting channel value of 0. The participants channel uses the is support agent supervisor impulse that has a magnitude of −3 and the previous participants channel value of +4, which is not changed by the passage of 15 minutes, for the updated participants channel value of +1. The problem scope channel uses the problem scope channel value of +1, which is not changed by the passage of 15 minutes, for a channel value of +1, and the problem impact channel uses the problem impact impulse that has a magnitude of +1, which is not changed by the passage of 15 minutes for a channel value of +1. Then the priority generator machine learning model 322 aggregates the updated customer-waiting channel value of 0, the updated participants channel value of +1, the unchanged problem scope channel value of +1, the unchanged problem impact channel value of +1, and the baseline value of 30 to generate an updated Needs Attention Score of 33.

The training priority generation system 318 trains the natural language processor machine learning model 320 to determine data for the support ticket's third communication 102, including content data which contains thanks for the recommended solution, metadata which identifies the thanker as the manager Ann, and context data which is used to classify the sentiment of Ann's thanks as unusually grateful. The training priority generation system 318 converts the content data for thanks into a follow-up acknowledged mpulse, the context data for unusually grateful into a grateful impulse, and then combines the follow-up acknowledged impulse and the grateful impulse into a closure of the support ticket.

For the real-time example, the production priority generation system 324 receives support ticket communications, which includes the support ticket 200 that contains all subsequent events 202 and 204, and the support ticket's metadata 206, as depicted by FIG. 2. Then the natural language processor machine learning model 326 determines data for the support ticket's first communication, including content data which contains a request for help with a remote mount problem, metadata which identifies the requester as a customer's manager named Chris, and context data which is used to classify the sentiment of Chris' request as unusually desperate. The production priority generation system 324 converts the content data for the request for help into a follow-up request impulse that has a magnitude of +4 in the customer-waiting channel. The production priority generation system 324 converts the content data for the remote mount problem into a remote mount impulse that has a magnitude of +1 in the problem scope channel, and a remote mount impulse that has a magnitude of +1 in the problem impact channel. The production priority generation system 324 converts the metadata identifying the requester Chris into an is manager vector impulse that has a magnitude of +2 in the participants channel and an is manager impulse that has a magnitude of +2 in the customer-waiting channel, because the customer who is waiting is a manager. The production priority generation system 324 converts the context data which is used to classify the request's sentiment into a unusually desperate impulse that has a magnitude of +2 in the participants channel, because the participant is desperate, and an unusually desperate impulse that has a magnitude of +2 in the customer-waiting channel, because the customer who is waiting is desperate.

Two hours pass and the channels convert their impulses into channel values. The customer-waiting channel uses the follow-up request impulse that has a magnitude of +4, the is manager impulse that has a magnitude of +2, the unusually desperate impulse that has a magnitude of +2, and a two hour incrementation value of +2 for the customer-waiting channel value of +10. The participants channel uses the is manager impulse that has a magnitude of +2 and the unusually desperate impulse that has a magnitude of +2, which is not changed by the passage of two hours, as the channel value of +4. The problem scope channel uses the remote mount impulse that has a magnitude of +1 which is not changed by the passage of two hours, for the channel value of +1 The problem impact channel uses the remote mount impulse that has a magnitude of +1 which is not changed by the passage of two hours for the channel value of +1. Then the priority generator machine learning model 328 aggregates the customer-waiting channel value of +10, the unchanged participants channel value of +4, the unchanged problem scope channel value of +1, the unchanged problem impact channel value of +1, and the baseline value of 30 to generate a Needs Attention Score of 46.

The natural language processor machine learning model 326 determines data from the support ticket's second communication, including content data which is a recommended solution for the remote mount problem, metadata which identifies the recommender as a support agent named Dana, and context data which infers that the support agent is waiting, based on the sequence of one customer request followed by one support agent recommendation. The production priority generation system 324 converts the content data for the recommended solution into a requested follow-up impulse, the context data for a support agent is waiting into a support waiting impulse, and then combines the requested follow-up impulse and the support waiting impulse into a support followed up impulse in the customer-waiting channel. The production priority generation system 324 converts the metadata which identifies the recommender Dana into an is support agent impulse that has a magnitude of −1 in the participants channel.

15 minutes pass and the channels convert their impulses into channel values. The customer-waiting channel uses the support followed up impulse and the previous customer-waiting channel value of +10, which is not changed by the passage of 15 minutes, for a channel value of 0. The participants channel uses the is support agent impulse that has a magnitude of −1 and the previous participants channel value of +4, which is not changed by the passage of 15 minutes, for a channel value of +3. The problem scope channel uses the problem scope channel value of +1, which is not changed by the passage of 15 minutes, for a channel value of +1, and uses the problem impact impulse that has a magnitude of +1, which is not changed by the passage of 15 minutes, for a channel value of +1. Then the priority generator machine learning model 328 aggregates the updated customer-waiting channel value of 0, the updated participants channel value of +3, the unchanged problem scope channel value of +1, the unchanged problem impact channel value of +1, and the baseline value of 30 to generate an updated Needs Attention Score of 35.

The natural language processor machine learning model 326 determines data for the support ticket's third communication 202, including content data which includes a request for help and a rejection of the recommended solution, metadata which identifies the requester as the manager Chris, and context data which is used to classify the sentiment of Chris' request as unusually frustrated, as depicted in FIG. 2. The production priority generation system 324 converts the content data for the request into a follow-up request impulse that has a magnitude of +4 in the customer-waiting channel, The production priority generation system 324 converts the content data for the rejection of the recommended solution into a rejected solution impulse that has a magnitude of +10 in the problem-solved channel. The production priority generation system 324 converts the metadata into a is manager impulse that has a magnitude of +3 in a participants channel, because the participant is a manager, and a manager-waiting impulse that has a magnitude of +4 in a customer-waiting channel because it is a manager who is waiting. The production priority generation system 324 converts the context data for unusually frustrated into a frustrated impulse that has a magnitude of +8 in the customer-sentiment channel, because the customer who is waiting is frustrated, and a new-participant impulse that has a magnitude of +2 in the participants channel, because Chris is a new participant in the support ticket based on previous communications. Then the production priority generation system 324 aggregates the customer-waiting channel value of +8, the problem-solved channel value of +10, the participants channel value of +5, the customer-sentiment channel value of +8, and the baseline value of 30 to generate a Needs Attention Score of 61.

The support organization will violate the service level agreement with the customer if four hours pass without a support response to a customer request. Two hours pass without a support response to Chris' latest request, and the channels convert their impulses into channel values. The customer-waiting channel uses the follow-up request impulse that has a magnitude of +4, the manager-waiting impulse that has a magnitude of +4, a two hour incrementation value of +2, and an impending service level agreement violation value of +15 to convert the previous customer-waiting channel value of +8 to the updated customer-waiting channel value of +25. The problem-solved channel uses the rejected solution impulse that has a magnitude of +10 which is not changed by the passage of two hours for a channel value of +10. The customer-sentiment channel uses the frustrated impulse that has a magnitude of +8 which is not changed by the passage of two hours for a channel value of +8. The participants channel uses the is manager impulse that has a magnitude of +3 and the new participant impulse that has a magnitude of +2 for a channel value of +5, which is not changed by the passage of two hours. Then the priority generator machine learning model 328 aggregates the updated customer-waiting channel value of +25, the unchanged problem-solved channel value of +10, the unchanged customer-sentiment channel value of +8, the unchanged participants channel value of +5, and the baseline value of 30 to generate a Needs Attention Score of 78, which triggers an alert to both Dana the support agent and to Bob, who is Dana's supervisor. The alert notifies the support agent and the support agent supervisor that a response needs to be sent to the customer within two hours to avoid a violation of the service level agreement that the support organization has with the customer.

The training priority generation system 318 and/or the production priority generation system 324 can integrate with a feedback loop, which captures information from the user interface or interaction layer and incorporates the captured information as inputs to the machine-learning models 320, 322, 326 and/or 328. The information captured is in essence the support organization management team's follow-up behavior on the generated priority as recorded via the user interface. For example, the management team may reject a generated priority for a variety of reasons, and in some cases manually modify the support ticket's priority. Sweeping in these follow-up actions back into the machine-learning models 320, 322, 326 and/or 328 can enable the machine-learning models 320, 322, 326 and/or 328 to be re-trained in a manner that closely follows the human-decision making component, which the training priority generation system 318 and/or the production priority generation system 324 attempts to model. This feedback loop can enable the machine-learning models 320, 322, 326 and/or 328 to evolve in a personalized manner with respect to the preferences of the management team, in a way that is relevant to the team. Furthermore, the training priority generation system 318 and/or the production priority generation system 324 can include key metrics captured from the user interface or interaction layer, such as page share counts and number of views, in order to account for implicit prioritizations from a support team's senior management personnel. This can enable the system 300 to refine the machine-learning models 320, 322, 326 and/or 328 over time as additional data are gathered from the user interface about factors that may impact priority beyond the immediate customer-support agent interactions in a ticketing system's support ticket itself.

When required, the machine-learning models 320, 322, 326 and/or 328 may be retrained to remain up to date and capture all the variations in incoming data. In addition, the system 300 can bootstrap the training of the machine-learning models 320, 322, 326 and/or 328. Since the machine-learning models 320, 322, 326 and/or 328 demonstrate portability, they may be deployed for support organizations that may be newer and have not yet gathered enough historical data to train their customized models.

The priority generator 330 may also use the channel values to generate scores that may be used to provide supplemental information for end users interested in understanding why a support ticket has a particular priority. The priority generator 330 can provide contextually different formats of a priority for different viewers or in different consumption contexts to make the priority more accessible, more immediately useful and/or more actionable. For example, the priority generator 330 generates the priority in multiple formats that are be used in different contexts, including a Needs Attention Score with a numerical value from 0-100, a numerical value from 1-10, predicted priorities such as from P0 to P4, and categorical values, such as from Important to Not Urgent, for viewers who have a low familiarity with the support organization and the support operations. In the last example, channel values could be used to categorize both the magnitude and nature of the Needs Attention Score for a support ticket into distinct categories. For example, in support tickets with high problem impact and customer-waiting channel values, the priority generator 330 could assign a category such as Customer Awaiting Response ASAP. In another example, a support ticket with high problem impact but low customer-waiting channel values, the priority generator 330 could assign a category such as Important—Not Urgent. A counterexample would be a category of Urgent—Not Important. These categorical values provide easily human-readable contexts for a support ticket to a viewer who does not need to evaluate other aspects of the support ticket to derive what if any actions need to be taken to address the customer's needs. However, the underlying channel values may still be useful for long-term trends or metric generation around the Needs Attention Score where absolute values on a set scale are desired.

In addition to using the channel values to generate the Needs Attention Score for a support ticket, the priority generator 330 can use each channel value directly or combined with multiple channel values to generate other scores that represent broad swathes of the logic pertaining to the support ticket's priority without fully encapsulating the logic pertaining to the support ticket's priority. For example, when instructed to display a different score for a support ticket, such as a sales-based score displayed to a sales representative, the priority generator 330 can execute even simpler logic to quickly and simply generate different scores for different contexts. As a result, the priority generator 330 can generate contextual scores in places where deploying the full priority generating service is impractical or undesirable, such as within a web application or web server that responds to many application requests. The full priority generating logic may be too complex to insert into a web application or too expensive to run as part of a web server for many requests, so the priority generator 330 can store contextual scores in locations where applications with low costs of development and deployment may retrieved and quickly act upon these contextual scores. For example, the priority generator 330 generates a Needs Attention Score and a different sales score for the same support ticket within a web application for support agents and sales representatives who have different intentions. While support agents view the Needs Attention Score that places a greater emphasis on immediate support needs, such as whether the assigned support agent needs to respond quickly, the sales representatives view a sales-based score that places a greater emphasis on contextual account factors. Therefore, the priority generator 330 can use any or all of the techniques described above to generate different contextual scores which provide maximal relevance across broader contexts, for a variety of use cases and applications, and for a variety of end users.

Different contextual scores for broader contexts may include generating the Needs Attention Score for a support ticket as a whole, and generating additional scores against other contexts or dimensions of reporting, such as using a subset of channel values to calculate a support agent score that measures how effective a support agent is at responding to and/or managing customer expectations, a product score that measures the importance of a product to a customer, and a customer score that measures the customer's perception of the quality of support received. A score can be a number that expresses accomplishment by comparison to a standard. A support agent can be a person who is responsible for providing an act of assistance.

The priority generator 330 can generate and update a support ticket's priority which influences additional relevant business metrics within any of the individual contexts. For example, the production priority generation system 324 can use the priorities of many support tickets to generate a Customer Engagement Score, which is a metric that indicates how and to what extent customers use a support organization's products. This Customer Engagement Score is sufficiently different in its method of calculation, conceptual value, and mode of consumption/business use case as to be considered an independent step in the processing pipeline as opposed to an additional dimension of the Needs Attention Score. For example, the priority generator 330 generates a Customer Engagement Score for a customer who opened a series of support tickets, with the Customer Engagement Score indicating that a product is critical to the customer's business. Such a customer may need reassurance regarding product quality and may also be a potential target for upsell opportunities or other support engagements that would improve their ability to use the product reliably. In another example, the production priority generation system 324 determines whether the magnitude of the change in the Needs Attention Score for a support ticket is sufficient to necessitate notifying members of a support organization.

The priority generator 330 can generate and update a support ticket's priority which becomes central to how a support organization prioritizes support tickets, and which may be leveraged in a wide variety of different ways. When the production priority generation system 324 determines that a support ticket's priority exceeds a priority threshold, the production priority generation system 324 can automatically generate an alert which can notify support agents outside of the CRM platform. Such alerts direct support agents to the most critical support tickets, even if the support agents are not actively using the CRM software at the time, further decreasing time to resolution of customer problems and increasing the value and customer perception of a support organization's capabilities.

A support organization administrator can set a priority threshold that determines when and how the production priority generation system 324 outputs an alert for a support ticket's priority. The administrator can increase the priority threshold for support tickets that are initiated by a customer who is not eligible for heightened support. The administrator can decrease the priority threshold for prized customers or for support tickets related to products that are dominant revenue generators. When a generated priority exceeds a priority threshold, the production priority generation system 324 can output an alert to the support agent responsible for the support ticket, or the support agent's supervisor, and/or the production priority generation system 324 can output the support ticket to the user interface of the support agent and/or the supervisor. Further, when a generated priority exceeds a specific priority threshold, the production priority generation system 324 can provide alerts to additional teams, such as sales and product development teams. Since the priority threshold can differ based on factors such as customer, product type, size of account, proximity to contract renewal, overall customer sentiment, potential churn risk, the priority threshold does not need to be the same across all support tickets.

The production priority generation system 324 can present support agents with a view of support tickets that is ordered by the support tickets' priorities, which automatically focuses attention on the most critical issues, and which provides a much more informed metric for a resolution strategy than the use of support tickets' ages as the primary basis for prioritizing the resolution of support tickets. The production priority generation system 324 can use a support ticket's priority to assign support tickets that require the most urgent attention to the best and most immediately available support agents at that time. Typically, this process of assigning support tickets is difficult to manage and cannot account for factors outside of the support organization's CRM system, such as account history, not to mention the content of the original support ticket communication. Often customers will express a desire for immediate and urgent support in ways that cannot be captured in metadata, but which the natural language processor machine learning model 326 can parse immediately to ensure that those support tickets receive priority over other, less immediate or urgent, support tickets.

The entities that the production priority generation system 324 analyzes are relevant even beyond the support domain, because factors extracted from these entities and their evolving relationships may be used to model behavior patterns in other business workflows which operate on the assumption of the desire for continuously sustained business relationships between a customer of a product and an organization related to the product across multiple product cycles. Therefore, the use of the system 300 that generates support ticket priorities may be extended beyond the support space to prioritize resources for responses to the communications between individuals, users, groups, teams, organizations, and businesses in spaces such as user service, sales, engineering, information technology, pharmaceutical, healthcare and medical devices industry, as well as the consumer electronics industry, which may use ticketing systems such as Jira, GitHub, ServiceNow, Salesforce, Zendesk, and Freshdesk.

Figure 4:
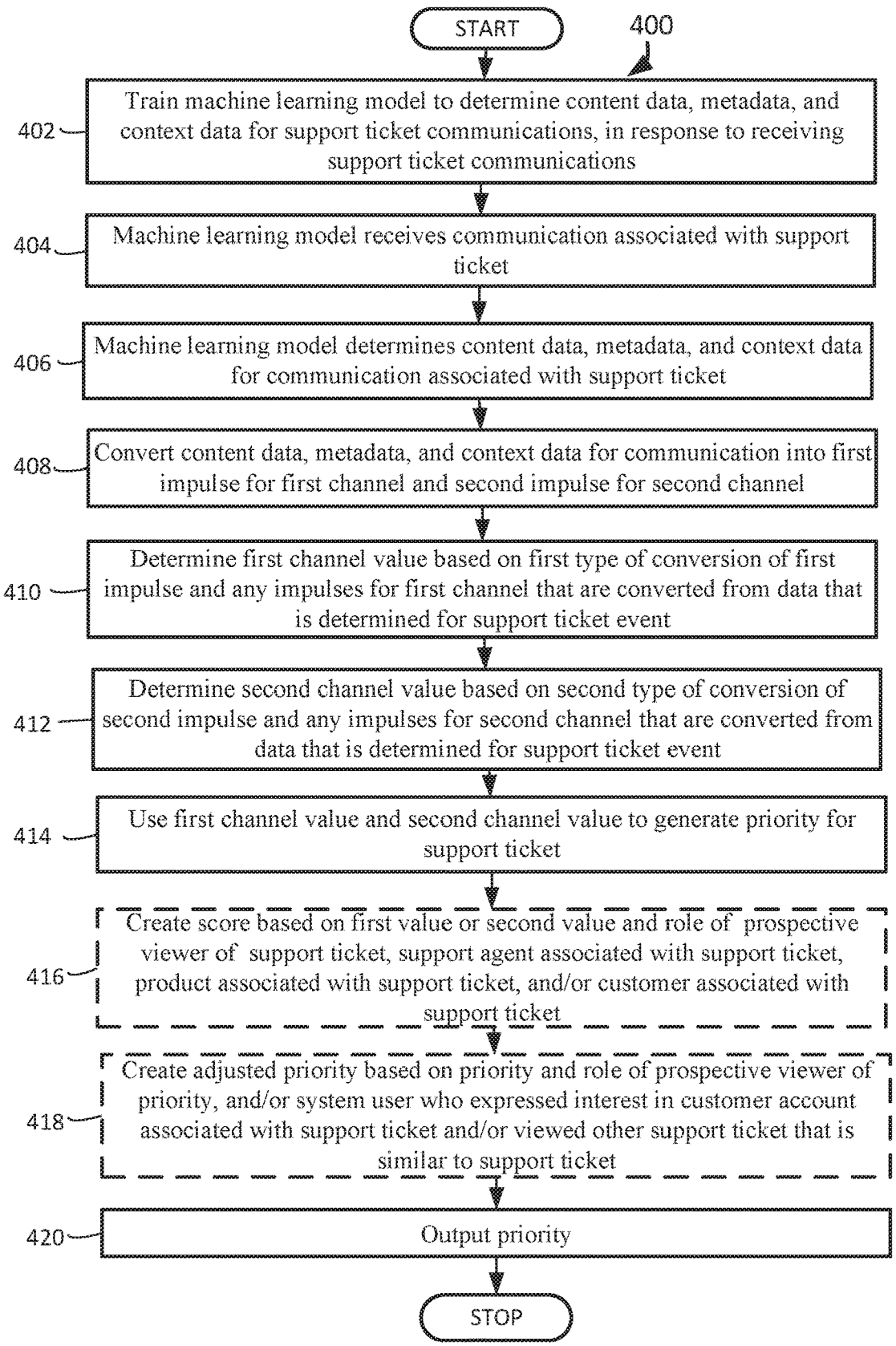
FIG. 4 is a flowchart that illustrates a computer-implemented method for generating priorities for support tickets, under an embodiment.

FIG. 4 is a flowchart that illustrates a computer-implemented method for generating priorities for support tickets, under an embodiment. Flowchart 400 depicts method acts illustrated as flowchart blocks for certain actions involved in and/or between the system elements 302-330 of FIG. 3.

A machine learning model is trained to determine content data, metadata, and context data for support ticket communications, in response to receiving the support ticket communications, block 402. The system trains a machine learning model as a natural language processor for support ticket communications. For example, and without limitation, this can include the training priority generation system 318 receiving a training set of support ticket communications, which includes the support ticket 100 that contains all subsequent communications 102 and the support ticket's metadata 104, as depicted by FIG. 1. Then the training priority generation system 318 trains the natural language processor machine learning model 320 to determine data for the support ticket's first communication, including content data which contains a request for help with a remote mount problem, metadata which identifies the requester as a customer's manager named Ann, and context data which is used to classify the sentiment of Ann's request as unusually desperate.

After being trained, the machine learning model receives a communication associated with a support ticket, block 404. The system receives a communication for determining a support ticket's priority. By way of example and without limitation, this can include the production priority generation system 324 receiving support ticket communications, which includes the support ticket 200 that contains all subsequent events 202 and 204, and the support ticket's metadata 206, as depicted by FIG. 2.

Following the receipt of a communication associated with a support ticket, a machine learning model determines content data, metadata, and context data for the communication, block 406. The system determines the data for a support tickets communication in order to generate the support ticket's priority. In embodiments, this can include the natural language processor machine learning model 326 determining data for the support ticket's third communication 202, including content data which contains a request for help and a rejection of the recommended solution, metadata which identifies the requester as the manager Chris, and context data which is used to classify the sentiment of Chris' request as unusually frustrated, as depicted in FIG. 2.

Following the determination of content data, metadata, and context data for a communication, the content data, metadata, and context data are converted into a first impulse for a first channel and a second impulse for a second channel, block 408. The system converts the communication data into impulses for channels. For example, and without limitation, this can include the production priority generation system 324 converting the content data for the request into a follow-up request impulse that has a magnitude of +4 in the customer-waiting channel, In another example, the production priority generation system 324 converts the content data for the rejection of the recommended solution into a rejected solution impulse that has a magnitude of +10 in the problem-solved channel. In yet another example, the production priority generation system 324 converts the metadata into a is manager impulse that has a magnitude of +3 in a participants channel, because the participant is a manager, and a manager-waiting impulse that has a magnitude of +4 in a customer-waiting channel because it is a manager who is waiting. In a further example, the production priority generation system 324 converts the context data for unusually frustrated into a frustrated impulse that has a magnitude of +8 in the customer-sentiment channel, and a new-participant impulse that has a magnitude of +2 in the participants channel, because Chris is a new participant in the ticket based on previous communications.

Having converted communication data to impulses in channels, a first channel determines a first channel value based on a first type of conversion of a first impulse and any impulses for the first channel that are converted from data that is determined for a support ticket event, block 410. The system determines the first channel's value. By way of example and without limitation, this can include the customer-waiting channel using the follow-up request impulse that has a magnitude of +4, the manager-waiting impulse that has a magnitude of +4, a two hour incrementation value of +2, and an impending service level agreement violation value of +15 to convert the previous customer-waiting channel value of +8 to the updated customer-waiting channel value of +25.

In addition to converting communication data to impulses in channels, a second channel determines a second channel value based on a second type of conversion of a second impulse and any impulses for the second channel that are converted from data that is determined for a support ticket event, block 412. The system determines the second channel's value. In embodiments, this can include the participants channel using the is manager impulse that has a magnitude of +3 and the new-participant impulse that has a magnitude of +2 for a channel value of +5, which is not changed by the passage of two hours. In additional examples, the problem-solved channel uses the rejected solution impulse that has a magnitude of +10 which is not changed by the passage of two hours for a channel value of +10, and the customer-sentiment channel uses the frustrated impulse that has a magnitude of +8 which is not changed by the passage of two hours for a channel value of +8.

After determining channel values, the first channel value and the second channel value are used to generate a priority for a support ticket, block 414. The system uses channel values to generate a support ticket's priority. For example, and without limitation, this can include the priority generator 330 aggregating the updated customer-waiting channel value of +25, the unchanged problem-solved channel value of +10, the unchanged customer-sentiment channel value of +8, the unchanged participants channel value of +5, and the baseline value of 30 to generate a Needs Attention Score of 78.

Along with generating the priority for a support ticket, a score is optionally created based on a first value or a second value and a role of a prospective viewer of a support ticket, a support agent associated with the support ticket, a product associated with the support ticket, and/or a customer associated with the support ticket, block 416. The system creates sub-scores based on a subset of the channel values. By way of example and without limitation, this can include the priority generator 330 using a subset of the channel values to generate a support agent score that measures how effective the support agent Dana is at responding to and/or managing customer expectations.

As another option, an adjusted priority may be created based on a priority and a role of a prospective viewer of the priority, and/or a system user who expressed an interest in a customer account associated with a support ticket and/or viewed another support ticket that is similar to the support ticket, block 418. The system adjusts the priority based on the viewing context. In embodiments, this can include the production priority generation system 324 detecting information which indicates that the support agent supervisor Bob is interested in the customer Ann's account and that the support agent Dana is interested in the customer Chris' account, so the priority generator 330 increases the Needs Attention Score of Ann's support ticket when displayed on Bob's list of open support tickets and increases the Needs Attention Score of Chris' support ticket from 78 to 83 when displayed on Dana's list of open support tickets, and alerts Dana about Chris' support ticket.

Having generated the priority for the support ticket, the priority is output, block 420. The system outputs the support ticket's priority. For example, and without limitation, this can include the priority generator 330 outputting a Needs Attention Score of 78, which triggers an alert to both Dana the support agent and to Bob, who is Dana's supervisor. The alert notifies the support agent and the support agent supervisor that a response needs to be sent to the customer within two hours to avoid a violation of the service level agreement that the support organization has with the customer.

Although FIG. 4 depicts the blocks 402-420 occurring in a specific order, the blocks 402-420 can occur in another order. In other implementations, each of the blocks 402-420 can also be executed in combination with other blocks and/or some blocks may be divided into a different set of blocks.

System Overview

Figure 5:
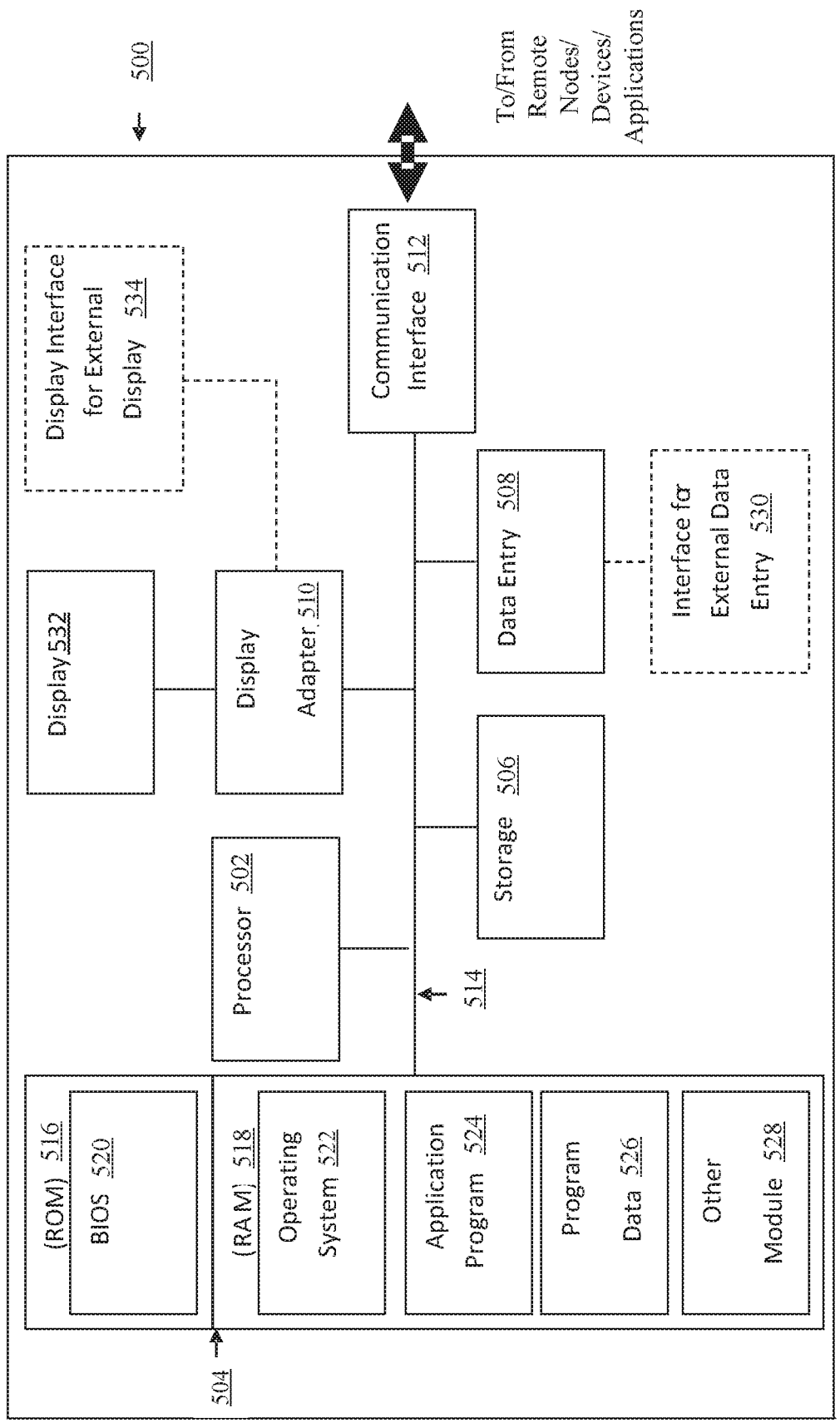
FIG. 5 is a block diagram illustrating an example hardware device in which the subject matter may be implemented.

In exemplary hardware device in which the subject matter may be implemented shall be described. Those of ordinary skill in the art will appreciate that the elements illustrated in FIG. 5 can vary depending on the system implementation. With reference to FIG. 5, an exemplary system for implementing the subject matter disclosed herein includes a hardware device 500, including a processing unit 502, a memory 504, a storage 506, a data entry module 508, a display adapter 510, a communication interface 512, and a bus 514 that couples elements 504-512 to the processing unit 502.

The bus 514 can comprise any type of bus architecture. Examples include a memory bus, a peripheral bus, a local bus, etc. The processing unit 502 is an instruction execution machine, apparatus, or device and can comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 can include a read only memory (ROM) 516 and a random access memory (RAM) 518. The memory 504 may be configured to store program instructions and data during operation of the hardware device 500. In various embodiments, the memory 504 can include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 can also include nonvolatile memory technologies such as nonvolatile flash RAM (NVRAM) or ROM. In some embodiments, it is contemplated that the memory 504 can include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 can include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like can also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user can enter commands and information into the hardware device 500 through data entry module 508. The data entry module 508 can include mechanisms such as a keyboard, a touch screen, a pointing device, etc. Other external input devices (not shown) are connected to the hardware device 500 via an external data entry interface 530. By way of example and not limitation, external input devices can include a microphone, joystick, game pad, satellite dish, scanner, or the like. In some embodiments, external input devices can include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, can function as both the data entry module 508 and the display 532. External display devices can also be connected to the bus 514 via the external display interface 534. Other peripheral output devices, not shown, such as speakers and printers, may be connected to the hardware device 500.

The hardware device 500 can operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 can interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 can include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter can also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for generating priorities for support tickets, the system comprising:
   one or more processors; and
   a non-transitory computer readable medium storing a plurality of instructions, which when executed, cause the one or more processors to:
   train a machine learning model to determine content data, metadata, context data, and their corresponding weights associated with priorities for support ticket communications, in response to receiving the support ticket communications;
   determine, by the trained machine learning model, content data, metadata, context data and their corresponding weights for a communication associated with a support ticket, in response to receiving the communication;
   convert the content data, the metadata, the context data, and their corresponding weights for the communication into a first information impulse for a first channel and a second information impulse for a second channel;
   determine, by the first channel, a first channel-specific value by executing a first type of channel-specific conversion of the first information impulse and any information impulses for the first channel that are converted from data that is determined for a support ticket event, wherein the first channel periodically increased or periodically decreased a magnitude of an information impulse;
   determine, by the second channel, a second channel-specific value by executing a second type of channel-specific conversion of the second information impulse and any information impulses for the second channel that are converted from the data that is determined for the support ticket event;

generate, using the first channel-specific value and the second channel-specific value, a priority for the support ticket;

output the priority;

refine the trained machine-learning model, in response to capturing all variations in incoming data, comprising the content data, the metadata, the context data, to determine data for generating support ticket priorities; and use the refined machine learning model to determine content data, metadata, context data and their corresponding weights associated with generating a priority for additional support ticket communications, in response to receiving the additional support ticket communications.

2. The system of claim 1, wherein the content data is associated with at least one of an impact of a problem associated with the support ticket, a scope of the problem, an entity affected by the problem, an urgency expressed for the problem, a category of the problem, a product associated with the problem, a request for a response to the communication, a reply improbability expressed in the communication, a communication time window, an expressed status of the support ticket, and an escalation indicator for the support ticket.

3. The system of claim 1, wherein the metadata is associated with at least one of an author of the communication, a viewer of the communication, a time and direction of the communication, a customer account associated with the communication, and an expressed interest in the customer account.

4. The system of claim 1, wherein the context data is associated with at least one of a time and an author of the communication relative to a time and an author of another communication which preceded the communication, a number of participants and a number of communications associated with the support ticket, roles and organizations associated with the participants, a history of a customer who created the communication, a historical response wait time associated with the customer, a historical product problem associated with the customer, historical statuses of support tickets associated with the customer, sales information associated with the customer, a contract status associated with the customer, a historical sentiment expressed by the customer, a role of a prospective viewer of the priority, and a system user who at least one of expressed an interest in the customer and viewed another support ticket that is similar to the support ticket.

5. The system of claim 1, wherein at least one of the first channel and the second channel is associated with the support ticket and at least one of a current wait by a customer for support, a response time, an account history, a communication activity, participants associated with the communication activity, a scope of a problem, and an impact of the problem.

6. The system of claim 1, wherein the plurality of instructions further causes the processor to create a score based on one of the first value and the second value and at least one of a role of a prospective viewer of the support ticket, a support agent associated with the support ticket, a product associated with the support ticket, and a customer associated with the support ticket; wherein outputting the priority comprises outputting the score.

7. The system of claim 1, wherein the plurality of instructions further causes the processor to create an adjusted priority based on the priority and at least one of a role of a prospective viewer of the priority, and a system user who at least one of expressed an interest in a customer account associated with the support ticket and viewed another support ticket that is similar to the support ticket, wherein outputting the priority comprises outputting the adjusted priority to a corresponding at least one of the system user and the prospective viewer.

8. A computer-implemented method for generating priorities for support tickets, the computer-implemented method comprising:

training a machine learning model to determine content data, metadata, context data, and their corresponding weights associated with priorities for support ticket communications, in response to receiving the support ticket communications;

determining, by the trained machine learning model, content data, metadata, context data and their corresponding weights for a communication associated with a support ticket, in response to receiving the communication;

converting the content data, the metadata, the context data, and their corresponding weights for the communication into a first information impulse for a first channel and a second information impulse for a second channel;

determining, by the first channel, a first channel-specific value by executing a first type of channel-specific conversion of the first information impulse and any information impulses for the first channel that are converted from data that is determined for a support ticket event, wherein the first channel periodically increased or periodically decreased a magnitude of an information impulse;

determining, by the second channel, a second channel-specific value by executing a second type of channel-specific conversion of the second information impulse and any information impulses for the second channel that are converted from the data that is determined for the support ticket event;

generating, using the first channel-specific value and the second channel-specific value, a priority for the support ticket;

outputting the priority;

refining the trained machine-learning model, in response to capturing all variations in incoming data, comprising the content data, the metadata, the context data, to determine data for generating support ticket priorities; and using the refined machine learning model to determine content data, metadata, context data and their corresponding weights associated with generating a priority for additional support ticket communications, in response to receiving the additional support ticket communications.

9. The computer-implemented method of claim 8, wherein the content data is associated with at least one of an impact of a problem associated with the support ticket, a scope of the problem, an entity affected by the problem, an urgency expressed for the problem, a category of the problem, a product associated with the problem, a request for a response to the communication, a reply improbability expressed in the communication, a communication time window, an expressed status of the support ticket, and an escalation indicator for the support ticket.

10. The computer-implemented method of claim 8, wherein the metadata is associated with at least one of an author of the communication, a viewer of the communication, a time and direction of the communication, a customer account associated with the communication, and an expressed interest in the customer account.

11. The computer-implemented method of claim 8, wherein the context data is associated with at least one of a time and an author of the communication relative to a time and an author of another communication which preceded the communication, a number of participants and a number of communications associated with the support ticket, roles and organizations associated with the participants, a history of a customer who created the communication, a historical response wait time associated with the customer, a historical product problem associated with the customer, historical statuses of support tickets associated with the customer, sales information associated with the customer, a contract status associated with the customer, a historical sentiment expressed by the customer, a role of a prospective viewer of the priority, and a system user who at least one of expressed an interest in the customer and viewed another support ticket that is similar to the support ticket.

12. The computer-implemented method of claim 8, wherein at least one of the first channel and the second channel is associated with the support ticket and at least one of a current wait by a customer for support, a response time, an account history, a communication activity, participants associated with the communication activity, a scope of a problem, and an impact of the problem.

13. The computer-implemented method of claim 8, wherein the computer-implemented method further comprises creating a score based on one of the first value and the second value and at least one of a role of a prospective viewer of the support ticket, a support agent associated with the support ticket, a product associated with the support ticket, and a customer associated with the support ticket; wherein outputting the priority comprises outputting the score.

14. The computer-implemented method of claim 8, wherein the computer-implemented method further comprises creating an adjusted priority based on the priority and at least one of a role of a prospective viewer of the priority, and a system user who at least one of expressed an interest in a customer account associated with the support ticket and viewed another support ticket that is similar to the support ticket, wherein outputting the priority comprises outputting the adjusted priority to a corresponding at least one of the system user and the prospective viewer.

15. A computer program product, comprising a non-transitory computer-readable medium having a computer-readable program code embodied therein to be executed by one or more processors, the program code including instructions to:
  train a machine learning model to determine content data, metadata, context data, and their corresponding weights associated with priorities for support ticket communications, in response to receiving the support ticket communications;
  determine, by the trained machine learning model, content data, metadata, context data and their corresponding weights for a communication associated with a support ticket, in response to receiving the communication;
  convert the content data, the metadata, the context data, and their corresponding weights for the communication into a first information impulse for a first channel and a second information impulse for a second channel;
  determine, by the first channel, a first channel-specific value by executing a first type of channel-specific conversion of the first information impulse and any information impulses for the first channel that are converted from data that is determined for a support ticket event, wherein the first channel periodically increased or periodically decreased a magnitude of an information impulse;
  determine, by the second channel, a second channel-specific value by executing a second type of channel-specific conversion of the second information impulse and any information impulses for the second channel that are converted from the data that is determined for the support ticket event;
  generate, using the first channel-specific value and the second channel-specific value, a priority for the support ticket;
  output the priority;
  refine the trained machine-learning model, in response to capturing all variations in incoming data, comprising the content data, the metadata, the context data, to determine data for generating support ticket priorities; and
  using the refined machine learning model to determine content data, metadata, context data and their corresponding weights associated with generating a priority for additional support ticket communications, in response to receiving the additional support ticket communications.

16. The computer program product of claim 15, wherein the content data is associated with at least one of an impact of a problem associated with the support ticket, a scope of the problem, an entity affected by the problem, an urgency expressed for the problem, a category of the problem, a product associated with the problem, a request for a response to the communication, a reply improbability expressed in the communication, a communication time window, an expressed status of the support ticket, and an escalation indicator for the support ticket.

17. The computer program product of claim 15, wherein the metadata is associated with at least one of an author of the communication, a viewer of the communication, a time and direction of the communication, a customer account associated with the communication, and an expressed interest in the customer account.

18. The computer program product of claim 15, wherein the context data is associated with at least one of a time and an author of the communication relative to a time and an author of another communication which preceded the communication, a number of participants and a number of communications associated with the support ticket, roles and organizations associated with the participants, a history of a customer who created the communication, a historical response wait time associated with the customer, a historical product problem associated with the customer, historical statuses of support tickets associated with the customer, sales information associated with the customer, a contract status associated with the customer, a historical sentiment expressed by the customer, a role of a prospective viewer of the priority, and a system user who at least one of expressed an interest in the customer and viewed another support ticket that is similar to the support ticket.

19. The computer program product of claim 15, wherein at least one of the first channel and the second channel is associated with the support ticket and at least one of a current wait by a customer for support, a response time, an account history, a communication activity, participants associated with the communication activity, a scope of a problem, and an impact of the problem.

20. The computer program product of claim 15, wherein the program code includes further instructions to:

create a score based on one of the first value and the second value and at least one of a role of a prospective viewer of the support ticket, a support agent associated with the support ticket, a product associated with the support ticket, and a customer associated with the support ticket; and create an adjusted priority based on the priority and at least one of a role of a prospective viewer of the priority, and a system user who at least one of expressed an interest in a customer account associated with the support ticket and viewed another support ticket that is similar to the support ticket, wherein outputting the priority comprises outputting at least one of the score and the adjusted priority to a corresponding at least one of the system user and the prospective viewer.

* * * * *